United States Patent
Cai et al.

(10) Patent No.: US 10,454,610 B2
(45) Date of Patent: Oct. 22, 2019

(54) 1+1 ETHERNET FABRIC PROTECTION IN A DISAGGREGATED OPTICAL TRANSPORT NETWORK SWITCHING SYSTEM

(71) Applicant: FUJITSU LIMITED, Kawasaki-shi, Kanagawa (JP)

(72) Inventors: Biaodong Cai, San Ramon, CA (US); Richard Dunsmore, McKinney, TX (US); Sanjay Gera, Plano, TX (US)

(73) Assignee: FUJITSU LIMITED, Kawasaki (JP)

(*) Notice: Subject to any disclaimer, the term of this patent is extended or adjusted under 35 U.S.C. 154(b) by 0 days.

(21) Appl. No.: 15/811,159

(22) Filed: Nov. 13, 2017

(65) Prior Publication Data

US 2019/0149260 A1    May 16, 2019

(51) Int. Cl.
*H04J 14/02* (2006.01)

(52) U.S. Cl.
CPC ........ *H04J 14/029* (2013.01); *H04J 14/0227* (2013.01); *H04J 14/0268* (2013.01)

(58) Field of Classification Search
CPC ... H04J 14/029; H04J 14/0268; H04J 14/0227
See application file for complete search history.

(56) References Cited

U.S. PATENT DOCUMENTS

| 7,602,703 | B2 | 10/2009 | Moore et al. |
| 9,942,633 | B2 | 4/2018 | Cai et al. |
| 1,017,845 | A1 | 1/2019 | Cai et al. |
| 1,021,905 | A1 | 2/2019 | Cai et al. |
| 2005/0123294 | A1 | 6/2005 | Mascolo et al. |
| 2008/0089693 | A1 | 4/2008 | El-Ahmadi et al. |
| 2009/0109843 | A1 | 4/2009 | Yang |
| 2009/0317073 | A1 | 12/2009 | Hotchkiss et al. |

(Continued)

FOREIGN PATENT DOCUMENTS

| EP | 2916496 | 9/2015 |
| EP | 2958279 | 12/2015 |
| EP | 3236601 | 10/2017 |

OTHER PUBLICATIONS

Office Action received from U.S. Appl. No. 15/419,569, dated Apr. 11, 2018; 7 pages.

(Continued)

*Primary Examiner* — Brian D Nguyen
(74) *Attorney, Agent, or Firm* — Baker Botts L.L.P.

(57) ABSTRACT

Methods and systems for Ethernet fabric protection in a disaggregated OTN switching system that include PIU modules each having multiple ports for OTN to Ethernet transceiving and an Ethernet fabric as a switching core are disclosed. An OTN over Ethernet module in each of the PIU modules may enable various OTN functionality to be realized using the Ethernet fabric which may include multiple Ethernet fabric planes. A PIU module may transmit Ethernet packets using a first working port over a first Ethernet fabric plane and may transmit Ethernet packets using a second working port over a second Ethernet fabric plane. When the PIU module detects a fault condition on the second Ethernet fabric plane, the PIU module may transmit Ethernet packets using a third protection port over the first Ethernet fabric plane instead of using the second working port.

20 Claims, 7 Drawing Sheets

(56) References Cited

U.S. PATENT DOCUMENTS

| | | | |
|---|---|---|---|
| 2010/0040368 A1 | 2/2010 | Kotrla et al. | |
| 2010/0265963 A1 | 10/2010 | Patenaude | |
| 2011/0255552 A1 | 10/2011 | Ellegard | |
| 2011/0280567 A1 | 11/2011 | Lyon et al. | |
| 2012/0033971 A1 | 2/2012 | Fourcand | |
| 2012/0063312 A1 | 3/2012 | Sarwar et al. | |
| 2013/0136446 A1 | 5/2013 | Hotchkiss et al. | |
| 2013/0163982 A1 | 6/2013 | Tochio | |
| 2013/0343747 A1 | 12/2013 | Sarwar et al. | |
| 2014/0193146 A1 | 7/2014 | Lanzone et al. | |
| 2015/0023368 A1 | 1/2015 | Connolly et al. | |
| 2015/0222705 A1* | 8/2015 | Stephens | G06F 3/0611 709/214 |
| 2016/0191425 A1* | 6/2016 | Schlansker | H04L 41/082 370/353 |
| 2016/0226578 A1 | 8/2016 | Yuan et al. | |
| 2017/0019168 A1* | 1/2017 | Menard | G02B 6/29395 |
| 2017/0063672 A1* | 3/2017 | Chhabra | H04L 41/0663 |
| 2017/0105060 A1* | 4/2017 | Oltman | H04Q 11/0005 |
| 2017/0118547 A1* | 4/2017 | West | G02B 6/43 |
| 2017/0230294 A1* | 8/2017 | Saksena | H04L 47/12 |
| 2017/0302560 A1* | 10/2017 | Luo | H04L 45/02 |
| 2017/0310538 A1 | 10/2017 | Cai et al. | |

OTHER PUBLICATIONS

Office Action received from U.S. Appl. No. 15/419,649, dated Apr. 10, 2018; 10 pages.

Office Action received from U.S. Appl. No. 15/419,751, dated Jun. 29, 2018; 17 pages.

Fujitsu Limited, "Fujitsu Significantly Expands Its 1FINITY Series of Optical Transmission System Equipment." http://www.fujitsu.com/global/about/resources/news/press-releases/2016/0323-01.html; 5 pages, 2016.

Hardy, S. "Fujitsu offers CFP2-ACO coherent optical transceiver." http://www.lightwaveonline.com/articles/2015/03/fujitsu-offers-cfp2-aco-coherent-optical-transceiver.html; 2 pages, 2015.

Hollingsworth, T. "White-Box Switches: Are you Ready?" http://www.networkcomputing.com/networking/white-box-switches-are-you-ready/1465296666; 21 pages, 2014.

Knudsen-Baas, Per Harald. "OTN switching." Norwegian University of Science and Technology; 140 pages, 2011.

Lipscomb, F. "What Is a CFP2-ACO?" https://www.neophotonics.com/what-is-a-cfp2-aco/; 9 pages, 2016.

Rajesh K, "Data Center Network—Top of Rack (TOR) vs End of Row (EOR) Design." http://www.excitingip.com/2802/data-center-network-top-of-rack-tor-vs-end-of-row-eor-design/; 10 pages, 2016.

Wikipedia, "C Form-factor Pluggable." https://en.wikipedia.org/wiki/C_Form-factor_Pluggable; 3 pages, 2016.

Wikipedia, "QSFP." https://en.wikipedia.org/wiki/QSFP; 2 pages, 2016.

Wikipedia, "Small form-factor pluggable transceiver." https://en.wikipedia.org/wiki/Small_form-factor_pluggable_transceiver; 7 pages, 2016.

Wikipedia, "Optical Carrier Transmission Rates." https://en.wikipedia.org/wiki/Optical_Carrier_transmission_rates, 2017; 4 pages.

Wikipedia, "VT1.5." https://en.wikipedia.org/wiki/VT1.5, 2017; 1 page.

Wikipedia, "Optical Transport Network." https://en.wikipedia.org/wiki/Optical_Transport_Network, 2016; 4 pages.

Wikipedia, "Synchronous Optical Networking." https://en.wikipedia.org/wiki/Synchronous_optical_networking, 2017; 17 pages.

International Telecommunication Union, "Interfaces for the Optical Transport Network" ITU-T G.709/Y.1331 (Jun. 2016); 244 pages.

International Telecommunication Union, "Architecture of Optical Transport Networks" ITU-T G.872 (Jan. 2017); 68 pages.

Wikipedia, "Digital Signal 1" https://en.wikipedia.org/wiki/Digital_Signal_1, 2017; 6 pages.

Extended European Search Report for European Patent Application No. 17167550.7, dated Sep. 20, 2017; 9 pages.

Extended European Search Report for European Patent Application No. 17167552.3, dated Sep. 21, 2017; 5 pages.

Office Action received from U.S. Appl. No. 15/419,751, dated Oct. 19, 2017; 24 pages.

* cited by examiner

1+1 ETHERNET FABRIC PROTECTION IN A DISAGGREGATED OPTICAL TRANSPORT NETWORK SWITCHING SYSTEM

BACKGROUND

Field of the Disclosure

The present disclosure relates generally to optical communication networks and, more particularly, to 1+1 Ethernet fabric protection in a disaggregated optical transport network switching system.

Description of the Related Art

Telecommunication, cable television and data communication systems use optical transport networks (OTN) to rapidly convey large amounts of information between remote points. In an OTN, information is conveyed in the form of optical signals through optical fibers, where multiple sub-channels may be carried within an optical signal. OTNs may also include various network elements, such as amplifiers, dispersion compensators, multiplexer/demultiplexer filters, wavelength selective switches, optical switches, couplers, etc. configured to perform various operations within the network.

In particular, OTNs may be reconfigured to transmit different individual channels using, for example, optical add-drop multiplexers (OADMs). In this manner, individual channels (e.g., wavelengths) may be added or dropped at various points along an optical network, enabling a variety of network configurations and topologies.

Furthermore, typically, an optical transport network (OTN) switch is used to centrally perform electrical switching of the sub-channels carried within an optical signal to different destinations.

SUMMARY

In one aspect, a disclosed optical transport network (OTN) switch may include an Ethernet fabric having a plurality of Ethernet fabric planes, each of the Ethernet fabric planes may include a corresponding Ethernet switch of a plurality of Ethernet switches. The OTN switch may also include a plurality of plug-in universal (PIU) modules each may have a plurality of PIU ports including a first PIU module. A first PIU port, a second PIU port, and a third PIU port of each of the plurality of PIU modules may be connected to a first Ethernet switch of a first Ethernet fabric plane of the Ethernet fabric. A fourth PIU port, a fifth PIU port, and a sixth PIU port of each of the plurality of PIU modules may be connected to a second Ethernet switch of a second Ethernet fabric plane of the Ethernet fabric. The first PIU module may transmit Ethernet packet traffic to the first Ethernet fabric plane using the first PIU port and the second PIU port and to the second Ethernet fabric plane using the fourth PIU port and the fifth PIU port. The first PIU module may also detect a fault condition on the Ethernet fabric. The first PIU module may further, when the fault condition may be a multiple port single plane fault condition associated with the second Ethernet fabric plane, stop transmission of the Ethernet packet traffic to the second Ethernet fabric plane using the fourth PIU port and the fifth PIU port and transmit the Ethernet packet traffic to the first Ethernet fabric plane using the third PIU port in addition to the first PIU port and the second PIU port.

In any of the disclosed embodiments of the OTN switch, prior to the detection of the fault condition, the first PIU module may generate parity information for optical data unit (ODU) samples in every three Ethernet packets of the Ethernet packet traffic using exclusive or (XOR) operations that may be included in a corresponding fourth Ethernet packet of the Ethernet packet traffic.

In any of the disclosed embodiments of the OTN switch, the OTN switch may also include a second PIU module. The second PIU module may receive the Ethernet packet traffic from the Ethernet fabric, determine whether three Ethernet packets including three ODU samples of the Ethernet packet traffic, and a fourth Ethernet packet including parity information for the three ODU samples of the Ethernet packet traffic have been received, and when only two Ethernet packets including two ODU samples of the three Ethernet packets and the fourth Ethernet packet have been received, recover a third ODU sample of the three ODU samples from the two ODU samples and the parity information received using XOR operations.

In any of the disclosed embodiments of the OTN switch, the first PIU module may, after the detection of the fault condition, generate parity information for ODU samples in every eight Ethernet packets of the Ethernet packet traffic using XOR operations that is included in a corresponding ninth Ethernet packet of the Ethernet packet traffic.

In any of the disclosed embodiments of the OTN switch, the OTN switch may also include a second PIU module. The second PIU module may receive the Ethernet packet traffic from the Ethernet fabric, determine whether eight Ethernet packets including eight ODU samples of the Ethernet packet traffic, and a ninth Ethernet packet including parity information for the eight ODU samples of the Ethernet packet traffic have been received, and when only seven Ethernet packets including seven ODU samples of the eight Ethernet packets and the ninth Ethernet packet have been received, recover an eighth ODU sample of the eight ODU samples from the seven ODU samples and the parity information received using XOR operations.

In any of the disclosed embodiments of the OTN switch, when the fault condition may be a single port single plane fault condition associated with the fourth PIU port on the Ethernet fabric, the first PIU module may stop transmission of the Ethernet packet traffic to the second Ethernet fabric plane using the fourth PIU port.

In any of the disclosed embodiments of the OTN switch, the OTN switch may also include a second PIU module. The second PIU module may, when the fault condition may be the multiple port single plane fault condition associated with the second Ethernet fabric plane, stop reception of the Ethernet packet traffic from the second Ethernet fabric plane using the fourth PIU port and the fifth PIU port of the second PIU module, and receive the Ethernet packet traffic from the first Ethernet fabric plane using the third PIU port in addition to the first PIU port and the second PIU port of the second PIU module.

In any of the disclosed embodiments of the OTN switch, when the fault condition detected may be the multiple port single plane fault condition associated with the second Ethernet fabric plane, the first PIU module may, after expiration of a first delay associated with the first PIU module, transmit the multiple port single plane fault condition associated with the second Ethernet fabric plane to other PIU modules of the plurality of PIU modules using the first Ethernet fabric plane, and after expiration of a second delay associated with the first PIU module, when there may be no occurrence of other fault conditions on the first Ethernet fabric plane, confirm the multiple port single plane fault condition associated with the second Ethernet fabric plane. The expiration of the second delay may be after the expiration of the first delay.

In any of the disclosed embodiments of the OTN switch, when the fault condition detected may be a single port single plane fault condition associated with the fourth PIU port and the second Ethernet fabric plane, the first PIU module may, after expiration of a first delay associated with the first PIU module, transmit the single port single plane fault condition associated with the fourth PIU port and the second Ethernet fabric plane to other PIU modules of the plurality of PIU modules using one of the fifth PIU port and the first Ethernet fabric plane, and after expiration of a second delay associated with the first PIU module, when there may be no occurrence of other fault conditions on the first Ethernet fabric plane, confirm the single port single plane fault condition associated with the fourth PIU port and the second Ethernet fabric plane. The expiration of the second delay may be after the expiration of the first delay.

In any of the disclosed embodiments of the OTN switch, when the fault condition detected may be a single port single plane fault condition associated with the fourth PIU port and the second Ethernet fabric plane, the first PIU module may, after expiration of a first delay associated with the first PIU module, transmit the single port single plane fault condition associated with the fourth PIU port and the second Ethernet fabric plane to other PIU modules of the plurality of PIU modules using one of the fifth PIU port and the first Ethernet fabric plane, and during a second delay associated with the first PIU module, when there may be an occurrence of other fault conditions on the second Ethernet fabric plane, transmit the multiple port single plane fault condition associated with the second Ethernet fabric plane to the other PIU modules using the first Ethernet fabric plane. The second delay may be after the expiration of the first delay.

In any of the disclosed embodiments of the OTN switch, the occurrence of other fault conditions on the second Ethernet fabric plane may include at least one of a second single port single plane fault condition associated with the second Ethernet fabric plane detected by the first PIU module, a second multiple port single plane fault condition associated with the second Ethernet fabric plane detected by the first PIU module, a third single port single plane fault condition associated with the second Ethernet fabric plane received from one of the other PIU modules, and a third multiple port single plane fault condition associated with the second Ethernet fabric plane received from one of the other PIU modules.

In another aspect, a disclosed method for Ethernet fabric protection, in an OTN switch that may include an Ethernet fabric having a plurality of Ethernet fabric planes, each of the Ethernet fabric planes may include a corresponding Ethernet switch of a plurality of Ethernet switches, and a plurality of plug-in universal (PIU) modules that each may have a plurality of PIU ports including a first PIU module. A first PIU port, a second PIU port, and a third PIU port of each of the plurality of PIU modules may be connected to a first Ethernet switch of a first Ethernet fabric plane of the Ethernet fabric, and a fourth PIU port, a fifth PIU port, and a sixth PIU port of each of the plurality of PIU modules may be connected to a second Ethernet switch of a second Ethernet fabric plane of the Ethernet fabric, may include transmitting, by the first PIU module, Ethernet packet traffic to the first Ethernet fabric plane using the first PIU port and the second PIU port and to the second Ethernet fabric plane using the fourth PIU port and the fifth PIU port. The method may also include detecting, by the first PIU module, a fault condition on the Ethernet fabric. The method may further include, when the fault condition may be a multiple port single plane fault condition associated with the second Ethernet fabric plane, stopping, by the first PIU module, transmission of the Ethernet packet traffic to the second Ethernet fabric plane using the fourth PIU port and the fifth PIU port and transmitting, by the first PIU module, the Ethernet packet traffic to the first Ethernet fabric plane using the third PIU port in addition to the first PIU port and the second PIU port.

In any of the disclosed embodiments of the method, the method may also include, prior to detecting the fault condition, generating parity information for optical data unit (ODU) samples in every three Ethernet packets of the Ethernet packet traffic using exclusive or (XOR) operations that may be included in a corresponding fourth Ethernet packet of the Ethernet packet traffic.

In any of the disclosed embodiments of the method, the method may also include receiving, by a second PIU module of the plurality of PIU modules, the Ethernet packet traffic from the Ethernet fabric, determining whether three Ethernet packets including three ODU samples of the Ethernet packet traffic, and a fourth Ethernet packet including parity information for the three ODU samples of the Ethernet packet traffic have been received, and when only two Ethernet packets including two ODU samples of the three Ethernet packets and the fourth Ethernet packet have been received, recovering a third ODU sample of the three ODU samples from the two ODU samples and the parity information received using XOR operations.

In any of the disclosed embodiments of the method, the method may also include, after detecting the fault condition, generating parity information for ODU samples in every eight Ethernet packets of the Ethernet packet traffic using XOR operations that is included in a corresponding ninth Ethernet packet of the Ethernet packet traffic.

In any of the disclosed embodiments of the method, the method may also include receiving, by a second PIU module of the plurality of PIU modules, the Ethernet packet traffic from the Ethernet fabric, determining whether eight Ethernet packets including eight ODU samples of the Ethernet packet traffic, and a ninth Ethernet packet including parity information for the eight ODU samples of the Ethernet packet traffic have been received, and when only seven Ethernet packets including seven ODU samples of the eight Ethernet packets and the ninth Ethernet packet have been received, recovering an eighth ODU sample of the eight ODU samples from the seven ODU samples and the parity information received using XOR operations.

In any of the disclosed embodiments of the method, the method may also include, when the fault condition may be a single port single plane fault condition associated with the fourth PIU port on the Ethernet fabric, stopping transmission of the Ethernet packet traffic to the second Ethernet fabric plane using the fourth PIU port.

In any of the disclosed embodiments of the method, the method may also include, when the fault condition may be the multiple port single plane fault condition associated with the second Ethernet fabric plane, stopping, by a second PIU module of the plurality of PIU modules, reception of the Ethernet packet traffic from the second Ethernet fabric plane using the fourth PIU port and the fifth PIU port of the second PIU module, and receiving, by the second PIU module, the Ethernet packet traffic from the first Ethernet fabric plane using the third PIU port in addition to the first PIU port and the second PIU port of the second PIU module.

In any of the disclosed embodiments of the method, the method may also include, when the fault condition detected may be the multiple port single plane fault condition associated with the second Ethernet fabric plane, after expiration of a first delay associated with the first PIU module, transmitting the multiple port single plane fault condition associated with the second Ethernet fabric plane to other PIU modules of the plurality of PIU modules using the first Ethernet fabric plane, and after expiration of a second delay associated with the first PIU module, when there may be no occurrence of other fault conditions on the first Ethernet fabric plane, confirming the multiple port single plane fault condition associated with the second Ethernet fabric plane. The expiration of the second delay may be after the expiration of the first delay.

In any of the disclosed embodiments of the method, the method may also include, when the fault condition detected may be a single port single plane fault condition associated with the fourth PIU port and the second Ethernet fabric plane, after expiration of a first delay associated with the first PIU module, transmitting the single port single plane fault condition associated with the fourth PIU port and the second Ethernet fabric plane to other PIU modules of the plurality of PIU modules using one of the fifth PIU port and the first Ethernet fabric plane, and after expiration of a second delay associated with the first PIU module, when there may be no occurrence of other fault conditions on the first Ethernet fabric plane, confirming the single port single plane fault condition associated with the fourth PIU port and the second Ethernet fabric plane. The expiration of the second delay may be after the expiration of the first delay.

In any of the disclosed embodiments of the method, the method may also include, when the fault condition detected may be a single port single plane fault condition associated with the fourth PIU port and the second Ethernet fabric plane, after expiration of a first delay associated with the first PIU module, transmitting the single port single plane fault condition associated with the fourth PIU port and the second Ethernet fabric plane to other PIU modules of the plurality of PIU modules using one of the fifth PIU port and the first Ethernet fabric plane, and during a second delay associated with the first PIU module, when there may be an occurrence of other fault conditions on the second Ethernet fabric plane, transmitting the multiple port single plane fault condition associated with the second Ethernet fabric plane to the other PIU modules using the first Ethernet fabric plane. The second delay may be after the expiration of the first delay.

In any of the disclosed embodiments of the method, the occurrence of other fault conditions on the second Ethernet fabric plane may include at least one of a second single port single plane fault condition associated with the second Ethernet fabric plane detected by the first PIU module, a second multiple port single plane fault condition associated with the second Ethernet fabric plane detected by the first PIU module, a third single port single plane fault condition associated with the second Ethernet fabric plane received from one of the other PIU modules, and a third multiple port single plane fault condition associated with the second Ethernet fabric plane received from one of the other PIU modules.

BRIEF DESCRIPTION OF THE DRAWINGS

For a more complete understanding of the present invention and its features and advantages, reference is now made to the following description, taken in conjunction with the accompanying drawings, in which.

Figure 1:
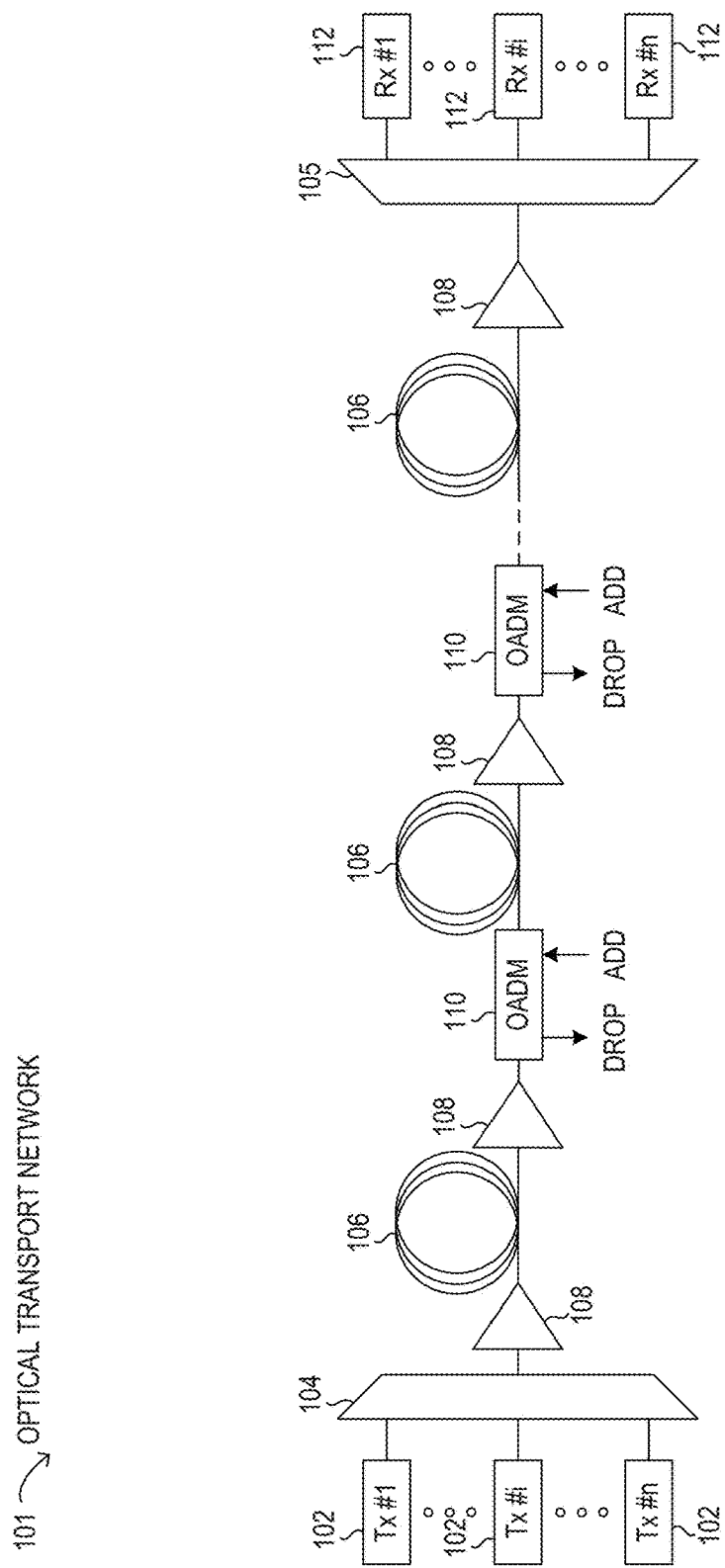
FIG. 1 is a block diagram of selected elements of an embodiment of an optical transport network (OTN)

DESCRIPTION OF PARTICULAR
EMBODIMENT(S)

In the following description, details are set forth by way of example to facilitate discussion of the disclosed subject matter. It should be apparent to a person of ordinary skill in the field, however, that the disclosed embodiments are exemplary and not exhaustive of all possible embodiments.

Throughout this disclosure, a hyphenated form of a reference numeral refers to a specific instance of an element and the un-hyphenated form of the reference numeral refers to the element generically or collectively. Thus, as an example (not shown in the drawings), device "12-1" refers to an instance of a device class, which may be referred to collectively as devices "12" and any one of which may be referred to generically as a device "12". In the figures and the description, like numerals are intended to represent like elements.

Turning now to the drawings, FIG. 1 illustrates an example embodiment of an optical transport network 101, which may represent an optical communication system. Optical transport network 101 may include one or more optical fibers 106 configured to transport one or more optical signals communicated by components of optical transport network 101. The network elements of optical transport network 101, coupled together by fibers 106, may comprise one or more transmitters 102, one or more multiplexers (MUX) 104, one or more optical amplifiers 108, one or more optical add/drop multiplexers (OADM) 110, one or more demultiplexers (DEMUX) 105, and one or more receivers 112.

Optical transport network 101 may comprise a point-to-point optical network with terminal nodes, a ring optical network, a mesh optical network, or any other suitable optical network or combination of optical networks. Optical fibers 106 comprise thin strands of glass capable of communicating the signals over long distances with very low loss. Optical fibers 106 may comprise a suitable type of fiber selected from a variety of different fibers for optical transmission.

Optical transport network 101 may include devices configured to transmit optical signals over optical fibers 106. Information may be transmitted and received through optical transport network 101 by modulation of one or more wavelengths of light to encode the information on the wavelength. In optical networking, a wavelength of light may also be referred to as a channel. Each channel may be configured to carry a certain amount of information through optical transport network 101.

To increase the information capacity and transport capabilities of optical transport network 101, multiple signals transmitted at multiple channels may be combined into a single wideband optical signal. The process of communicating information at multiple channels is referred to in optics as wavelength division multiplexing (WDM). Coarse wavelength division multiplexing (CWDM) refers to the multiplexing of wavelengths that are widely spaced having low number of channels, usually greater than 20 nm and less than sixteen wavelengths, and dense wavelength division multiplexing (DWDM) refers to the multiplexing of wavelengths that are closely spaced having large number of channels, usually less than 0.8 nm spacing and greater than forty wavelengths, into a fiber. WDM or other multi-wavelength multiplexing transmission techniques are employed in optical networks to increase the aggregate bandwidth per optical fiber. Without WDM, the bandwidth in optical networks may be limited to the bit-rate of solely one wavelength. With more bandwidth, optical networks are capable of transmitting greater amounts of information. Optical transport network 101 may be configured to transmit disparate channels using WDM or some other suitable multichannel multiplexing technique, and to amplify the multichannel signal.

Optical transport network 101 may include one or more optical transmitters (Tx) 102 configured to transmit optical signals through optical transport network 101 in specific wavelengths or channels. Transmitters 102 may comprise a system, apparatus or device configured to convert an electrical signal into an optical signal and transmit the optical signal. For example, transmitters 102 may each comprise a laser and a modulator to receive electrical signals and modulate the information contained in the electrical signals onto a beam of light produced by the laser at a particular wavelength, and transmit the beam for carrying the signal throughout optical transport network 101.

Multiplexer 104 may be coupled to transmitters 102 and may be a system, apparatus or device configured to combine the signals transmitted by transmitters 102, e.g., at respective individual wavelengths, into a WDM signal.

Optical amplifiers 108 may amplify the multi-channeled signals within optical transport network 101. Optical amplifiers 108 may be positioned before and after certain lengths of fiber 106. Optical amplifiers 108 may comprise a system, apparatus, or device configured to amplify optical signals. For example, optical amplifiers 108 may comprise an optical repeater that amplifies the optical signal. This amplification may be performed with opto-electrical (O-E) or electro-optical (E-O) conversion. In some embodiments, optical amplifiers 108 may comprise an optical fiber doped with a rare-earth element to form a doped fiber amplification element. When a signal passes through the fiber, external energy may be applied in the form of a pump signal to excite the atoms of the doped portion of the optical fiber, which increases the intensity of the optical signal. As an example, optical amplifiers 108 may comprise an erbium-doped fiber amplifier (EDFA).

OADMs 110 may be coupled to optical transport network 101 via fibers 106. OADMs 110 comprise an add/drop module, which may include a system, apparatus or device configured to add or drop optical signals (i.e., at individual wavelengths) from fibers 106. After passing through an OADM 110, an optical signal may travel along fibers 106 directly to a destination, or the signal may be passed through one or more additional OADMs 110 and optical amplifiers 108 before reaching a destination.

In certain embodiments of optical transport network 101, OADM 110 may represent a reconfigurable OADM (ROADM) that is capable of adding or dropping individual or multiple wavelengths of a WDM signal. The individual or multiple wavelengths may be added or dropped in the optical domain, for example, using a wavelength selective switch (WSS) (not shown) that may be included in a ROADM.

As shown in FIG. 1, optical transport network 101 may also include one or more demultiplexers 105 at one or more destinations of network 101. Demultiplexer 105 may comprise a system apparatus or device that acts as a demultiplexer by splitting a single composite WDM signal into individual channels at respective wavelengths. For example, optical transport network 101 may transmit and carry a forty (40) channel DWDM signal. Demultiplexer 105 may divide the single, forty channel DWDM signal into forty separate signals according to the forty different channels.

In FIG. 1, optical transport network 101 may also include receivers 112 coupled to demultiplexer 105. Each receiver 112 may be configured to receive optical signals transmitted at a particular wavelength or channel, and may process the optical signals to obtain (e.g., demodulate) the information (i.e., data) that the optical signals contain. Accordingly, network 101 may include at least one receiver 112 for every channel of the network.

Optical networks, such as optical transport network 101 in FIG. 1, may employ modulation techniques to convey information in the optical signals over the optical fibers. Such modulation schemes may include phase-shift keying (PSK), frequency-shift keying (FSK), amplitude-shift keying (ASK), and quadrature amplitude modulation (QAM), among other examples of modulation techniques. In PSK, the information carried by the optical signal may be conveyed by modulating the phase of a reference signal, also known as a carrier wave, or simply, a carrier. The information may be conveyed by modulating the phase of the signal itself using two-level or binary phase-shift keying (BPSK), four-level or quadrature phase-shift keying (QPSK), multi-level phase-shift keying (M-PSK) and differential phase-shift keying (DPSK). In QAM, the information carried by the optical signal may be conveyed by modulating both the amplitude and phase of the carrier wave. PSK may be considered a subset of QAM, wherein the amplitude of the carrier waves is maintained as a constant. Additionally, polarization division multiplexing (PDM) technology may enable achieving a greater bit rate for information transmission. PDM transmission comprises modulating information onto various polarization components of an optical signal associated with a channel. The polarization of an optical signal may refer to the direction of the oscillations of the optical signal. The term "polarization" may generally refer to the path traced out by the tip of the electric field vector at a point in space, which is perpendicular to the propagation direction of the optical signal.

In an optical network, such as optical transport network 101 in FIG. 1, it is typical to refer to a management plane, a control plane, and a transport plane (sometimes called the physical layer). A central management host (not shown) may reside in the management plane and may configure and supervise the components of the control plane. The management plane includes ultimate control over all transport plane and control plane entities (e.g., network elements). As an example, the management plane may consist of a central processing center (e.g., the central management host), including one or more processing resources, data storage components, etc. The management plane may be in electrical communication with the elements of the control plane and may also be in electrical communication with one or more network elements of the transport plane. The management plane may perform management functions for an overall system and provide coordination between network elements, the control plane, and the transport plane. As examples, the management plane may include an element management system (EMS), which handles one or more network elements from the perspective of the elements, a network management system (NMS), which handles many devices from the perspective of the network, and an operational support system (OSS), which handles network-wide operations.

Modifications, additions or omissions may be made to optical transport network 101 without departing from the scope of the disclosure. For example, optical transport network 101 may include more or fewer elements than those depicted in FIG. 1. Also, as mentioned above, although depicted as a point-to-point network, optical transport network 101 may comprise any suitable network topology for transmitting optical signals such as a ring, a mesh, or a hierarchical network topology.

As discussed above, the amount of information that may be transmitted over an optical network may vary with the number of optical channels coded with information and multiplexed into one signal. Accordingly, an optical fiber employing a WDM signal may carry more information than an optical fiber that carries information over a single channel. Besides the number of channels and number of polarization components carried, another factor that affects how much information can be transmitted over an optical network may be the bit rate of transmission. The higher the bit rate, the greater the transmitted information capacity. Achieving higher bit rates may be limited by the availability of wide bandwidth electrical driver technology, digital signal processor technology and increase in the required OSNR for transmission over optical transport network 101.

As shown in FIG. 1, optical transport network 101 may employ a digital wrapper technology to encapsulate existing frames of data, which may originate in a variety of native protocols, and may add packetized overhead for addressing, management, and quality assurance purposes. The resulting optical signal, in the form of optical data units (ODUs) may then be transported using individual optical wavelengths by optical transport network 101. The packetized overhead may be used to monitor and control the optical signals being transported using any of a variety of different protocols. In particular embodiments, operation of optical transport network 101 is performed according to optical transport networking (OTN) standards or recommendations promulgated by the International Telecommunications Union (ITU), such as ITU-T G.709—"Interfaces for the Optical Transport Network" and ITU-T G.872—"Architecture of the Optical Transport Network", among others. The optical wavelengths in OTN may rely on a hierarchical implementation of time-division multiplexing (TDM) to optimize carrier wavelength efficiency.

As a result of the hierarchical TDM arrangement of the optical signals in OTN, OTN switching may be performed at different sub-wavelength bit rates along optical transport network 101. As used herein, OTN switching refers to switching ODU paths of different bit rates with the ODU being the atomic unit of switching. In contrast, Internet protocol (IP) switching, such as by an IP router, refers to switching of network signals where an individual IP packet is the atomic unit of switching. In OTN switching, such as in optical transport network 101, an ODU remains in the optical domain outside of an OTN switch from network ingress to network egress. Within the OTN switch, an ODU may be accessed as an electrical domain object and OTN switching may include electrical switching technology.

It is noted that while OTN switching does generally take place in the DWDM domain, ROADMs and DWDM may be formally referred to as layer0 technologies (in The Basic Reference Model for Open Systems Interconnection, also referred to as the OSI Reference Model). In contrast, OTN may be described as a layer1 technology in the OSI Reference Model, which may operate independently of the optical wavelength domain (DWDM). For example, an OTN switch may theoretically operate over dark fiber, galvanic conductors (such as copper), or over a wireless medium (such as a millimeter-scale wave, or radio frequencies).

In general, the term "distributed" may refer to multiple nodes, or network elements (NEs), interconnected by a network and a set of collaborating nodes (or NEs). As used herein, the term "disaggregated" may refer to a NE in a distributed network that is further reorganized into a set of disaggregated sub-components in a physical sense, as compared to an aggregated physical structure, while maintaining the functionality of an integrated NE in a logical sense. In some embodiments, the disaggregated sub-components may be made openly accessible, in contrast to the aggregated physical structure.

In contrast to the centralized and embedded nature of an OTN switch, which is a unitary device at a single central location, a disaggregated OTN switching system is disclosed herein. The disaggregated OTN switching system disclosed herein may enable disaggregation of the core switching functionality with the network interface functionality. The disaggregated OTN switching system disclosed herein may enable OTN switching by relying on an internal Ethernet switching core (also referred to herein as an "Ethernet fabric"). The disaggregated OTN switching system disclosed herein may accordingly enable rapid customized configuration of a particular switching functionality at a particular location or at different remote locations. The disaggregated OTN switching system disclosed herein may enable much lower cost OTN switching than by using an OTN switch. The disaggregated OTN switching system disclosed herein may enable a much greater scalability as compared to the fixed switching capacity that is inherent in an OTN switch, because the Ethernet fabric employed may be external network infrastructure, such as data center switching systems, that can be expanded to a desired capacity. The disaggregated OTN switching system disclosed herein may be implemented using a plurality of plug-in universal (PIU) modules that provide interfacing and transceiving functionality between various OTN signals and Ethernet signals. The disaggregated OTN switching system disclosed herein may be further implemented using PIU blade chassis that have interface slots populated by a number of PIU modules, which are interconnected, powered, and controlled using the PIU blade chassis. Certain ones of PIU modules disclosed herein may enable localized direct OTN switching functionality by interconnecting two or more PIU modules in a loop-back configuration, without the use of a core Ethernet fabric.

Figure 2:
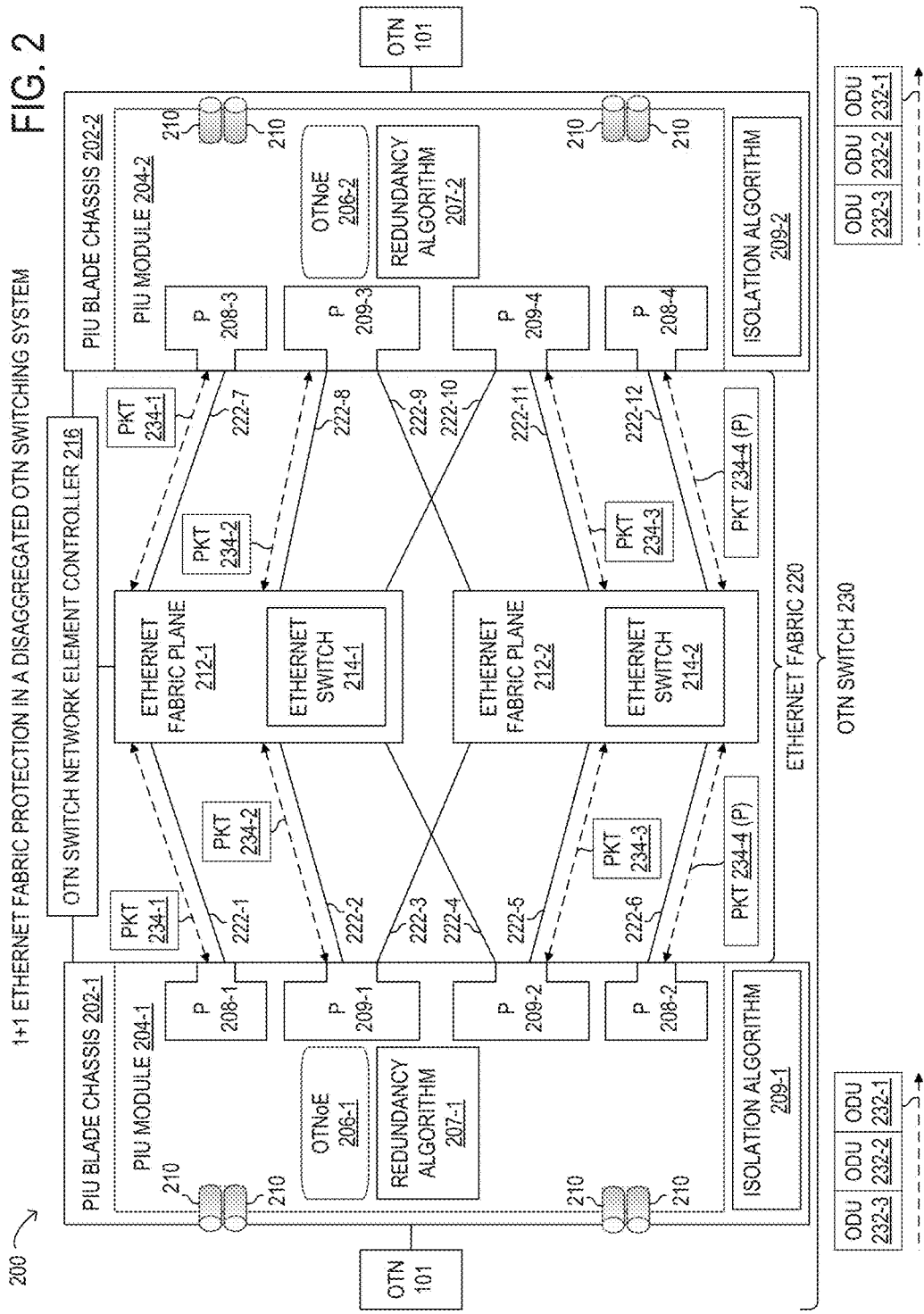
FIG. 2 is a block diagram of selected elements of an embodiment of a disaggregated OTN switching system.

Referring now to FIG. 2, a block diagram of selected elements of an embodiment of a disaggregated OTN switching system 200 for 1+1 Ethernet fabric protection is illustrated. Disaggregated OTN switching system 200 in FIG. 2 may be implemented for external switching of optical signals associated with optical transport network 101 (see FIG. 1) and is a schematic diagram for descriptive purposes and is not drawn to scale or perspective. External switching of optical signals refers to switching optical data unit (ODU) paths of different bit rates with an ODU being the atomic unit of switching, where the different bit rates may be sub-wavelength bit rates, and the ODU remains in the optical domain outside of an OTN switch 230 from network ingress to network egress. It is noted that within disaggregated OTN switching system 200, an ODU may be accessed as an electrical domain object and OTN switching may include electrical switching technology.

As shown in FIG. 2, disaggregated OTN switching system 200 may include PIU blade chassis 202-1 and 202-2, an Ethernet fabric 220, and an OTN switch network element (NE) controller 216. PIU blade chassis 202-1 and 202-2 may include PIU modules 204-1 and 204-2, respectively. PIU blade chassis 202 may be rack-mounted enclosures having an internal bus and an internal processor. PIU blade chassis 202 may receive PIU modules 204 via individual slots that connect PIU modules 204 to the internal bus. The internal bus may provide power and coordination among PIU modules 204. In certain embodiments, PIU blade chassis 202 includes a network connection for direct communication to OTN switch network element controller 216. It is noted that PIU blade chassis 202 may be implemented with different numbers of slots and may be implemented in different form factors. It is noted that PIU modules 204 may have front side network connections for access while PIU modules 204 populate slots in PIU blade chassis 202. In some embodiments, PIU blade chassis 202 may include one or more PIU modules 204.

As shown in FIG. 2, disaggregated OTN switching system 200 is configured to function as OTN switch 230, in which optical signals having ODUs 232 connected to PIU modules 204 may be interconnected and logically switched among PIU modules 204. At the core of disaggregated OTN switching system 200 is an Ethernet fabric 220. Each of PIU modules 204 may function as a transceiver, with OTN inputs and outputs 210 (shown as cylindrical ports) being respectively converted from ODUs 232 each having an ODU header to Ethernet packets 234 each having an Ethernet switching header that are then switchable by one or more Ethernet switches 214. Ethernet fabric 220 may employ Ethernet switches 214 in any kind of Ethernet switching architecture or Ethernet switching domain. In various embodiments, Ethernet fabric 220 may be implemented as a hierarchical spine-leaf architecture, which has become commonplace in many data center rack domains. Thus, each rack may have a so-called top-of-rack (TOR) leaf switch that operates at a relative low data throughput capacity, while the TOR leaf switches are then interconnected using a spine switch that operates at a relatively high data throughput capacity. In this manner, Ethernet fabric 220 may be hierarchically implemented using different numbers of TOR leaf switches and spine switches for any given network switching application, including aggregation into very large throughput Ethernet fabrics 220 that may have data throughput capacity of several dozens of terabytes, or even greater.

Interconnections 222, including interconnections 222-1 through 222-12, between PIU modules 204 and Ethernet fabric 220 may be copper cabled connections, such as 1000BASE-CX, 1000BASE-KX, 1000BASE-T, and 1000BASE-TX for 1 GB Ethernet; such as 10GBASE-CX4, small form factor pluggable+ (SFP+), 10GBASE-T, and 10GBASE-KX4 for 10 GB Ethernet; and such as 100GBASE-CR10, 100GBASE-CR4, 100GBASE-KR4, and 100GBASE-KP4 for 100 GB Ethernet, among other potential types of copper-cable based ports. In some embodiments, interconnections 222 between PIU modules 204 and Ethernet fabric 220 may be optical fiber Ethernet connections that are supported according to a variety of Ethernet standards for optical Ethernet ports. For example, for 100 GB Ethernet interconnections 222 to Ethernet fabric 220, interconnections 222 may be any one or more of 100GBASE-SR10, 100GBASE-SR4, 100GBASE-LR4, 100GBASE-ER4, 100GBASE-CWDM4, 100GBASE-PSM4, 100GBASE-ZR, 100GBASE-KR4, and 100GBASE-KP4. For example, for up to 400 GB Ethernet interconnections 222 to Ethernet fabric 220, interconnections 222 may be any one or more of 400GBASE-SR16, 400GBASE-DR4, 400GBASE-FR8, and 400GBASE-LR8. Furthermore, in certain embodiments, interconnections 222 to Ethernet fabric 220 may utilize FlexEthernet (FlexE) in order to mix different transmission rates across Ethernet fabric 220.

Among the form factors for PIU ports 208 and PIU ports 209 used in PIU modules 204 are quad small form-factor pluggable (QFSP, QSFP-28, QSFP-DD), C form-factor pluggable (CFP, CFP2), and SFP+. For example, on the OTN line side, CFP2 ports supporting analog coherent optics (ACO) may be used in PIU modules 204, such as for 100 gigabit (100G) or 200 gigabit (200G) coherent OTN connections. On the Ethernet fabric line side, for example, QFSP-28 ports may be used for PIU ports 208 in PIU modules 204, such as for 100 gigabit Ethernet (100GE), and QFSP-DD may be used for PIU ports 209 in PIU modules 204, such as for 100GE and 200 gigabit Ethernet (200GE).

Each PIU module 204 in disaggregated OTN switching system 200 is further equipped with an OTN over Ethernet (OTNoE) module 206, respectively, which may be an application specific integrated circuit (ASIC), an ASSP (application specific standard product), or a field-programmable gate array (FPGA) that is customized for a particular purpose. OTNoE module 206 in PIU module 204 may provide specific functionality to enable overall operation of disaggregated OTN switching system 200 as OTN switch 230. OTNoE module 206 may be enabled to implement, in the context of disaggregated OTN switching system 200, various types of OTN functionality over Ethernet fabric 220. OTNoE module 206 may support or enable functionality for OTN path redundancy and path protection switching using Ethernet fabric 220. OTNoE module 206 may support or enable functionality for concatenation of OTN path protection domains. OTNoE module 206 may support or enable functionality for distribution of OTN network paths and ODUs associated with the network paths over a 1:N Ethernet fabric connections, where 1 Ethernet switch 212 is used to protect N other working Ethernet switches 212 in case any one of the N working Ethernet switches 212 has a failure or indicates performance of a maintenance operation that may result in an offline state. Furthermore, both 1:N and 0:N protection schemes may be supported. OTNoE module 206 may support or enable functionality for distribution of OTN network paths and ODUs 232 associated with the network paths over two Ethernet fabric planes 212 for 1+1 Ethernet fabric protection, where two protection interconnections 222-3 and 222-4 are used to protect four other working interconnections 222-1, 222-2, 222-5, and 222-6 and two other protection interconnections 222-9 and 222-10 are used to protect four other working interconnections 222-7, 222-8, 222-11, and 222-12 in case one Ethernet fabric plane 212 has a failure or indicates performance of a maintenance operation that may result in an offline state. Given the nature of very high speed switching for both OTN applications and for Ethernet fabrics 220, as well as the cost and complexity of using external memory with OTNoE module 206, a latency delay variation may be experienced among Ethernet switches 212. The latency delay variation (or jitter) by Ethernet fabric 220 may be an important factor to consider when choosing an ODU path distribution scheme and a particular Ethernet fabric 220 when a protection scheme is used. OTNoE module 206 may support or enable functionality for ensuring ODU path and data integrity over Ethernet fabric 220, even when jitter occurs over Ethernet fabric 220. OTNoE module 206 may support or enable functionality for switching higher level ODUs 232 over Ethernet fabric 220, even when the data throughput for the higher level ODUs 232 is larger than the underlying Ethernet ports in Ethernet fabric 220. The OTNoE module 206 may support or enable functionality for compressing OTN traffic to provide more efficient connections to Ethernet fabric 220 while compensating for jitter and bit error rate (BER) losses that may occur over Ethernet fabric 220, in order to enable using Ethernet fabric 220 for OTN switching.

In FIG. 2, OTNoE module 206 may utilize a redundancy algorithm 207 to detect and correct soft bit errors that may occur on working interconnections 222-1, 222-2, 222-5, 222-6, 222-7, 222-8, 222-11, and 222-12. For example, soft bits errors on a working interconnection 222 may result in an Ethernet frame drop error condition. OTNoE module 206 may detect the Ethernet frame drop error condition and recover the lost Ethernet frame by utilizing redundancy algorithm 207. Redundancy algorithm 207 may be a one to N (1:N) redundancy algorithm that supports a 1:N redundancy mode, which may enable the recovery of one Ethernet packet 234 of N+1 Ethernet packets 234 that may have been lost during the transmission of the N+1 Ethernet packets 234.

During operation, PIU module 204 may receive and convert ODUs 232 of ODU traffic to N Ethernet packets 234 including N ODU samples of the ODUs 232. When PIU module 204 utilizes redundancy algorithm 207 in 1:N redundancy mode, redundancy algorithm 207 may perform an exclusive or (XOR) operation on the N ODU samples of the N Ethernet packets 234 to generate parity information for the N ODU samples. Each of the N ODU samples in each of the N Ethernet packets 234 may be equal in length. For example, parity information (P) may be equal to (P=ODU sample 1 XOR ODU sample 2 XOR ODU sample 3 . . . XOR ODU sample N). PIU module 204 may include the parity information in an $(N+1)^{th}$ Ethernet packet 234. PIU module 204 may include information in each packet switching header of the N+1 Ethernet packets 234 to indicate that the N+1 Ethernet packets 234 are associated with each other. For example, the information may include a sequence number of the Ethernet packet 234, a group sequence number that indicates which Ethernet packets 234 are associated with each other, and a packet type indicator that indicates whether the Ethernet packet 234 contains an ODU sample or parity information, among other types of information. PIU module 204 may transmit the N+1 Ethernet packets 234 of Ethernet packet traffic to another PIU module 204. The other PIU module 204 may receive at least N Ethernet packets 234 of the N+1 Ethernet packets 234 of the Ethernet packet traffic. The other PIU module 204 may determine whether the N Ethernet packets including the N ODU samples, and an $(N+1)^{th}$ Ethernet packet including the parity information for the N ODU samples of the Ethernet packet traffic have been received. The other PIU module 204 may use the information in each packet switching header to determine the N+1 Ethernet packets 234 that are associated with each other, which of the N+1 Ethernet packets 234 contain ODU samples, which one of the N+1 Ethernet packets 234 contains the parity information, and whether any of the N+1 Ethernet packets 234 may have been lost. When the other PIU module 204 determines that only N−1 Ethernet packets including N−1 ODU samples of the N Ethernet packets and the $(N+1)^{th}$ Ethernet packet have been received, the other PIU module may utilize redundancy algorithm 207 in 1:N redundancy mode to reconstruct and recover the $N^{th}$ ODU sample of the N ODU samples that was lost from the N−1 ODU samples and the parity information received using XOR operations. The Nth ODU sample may have been lost due to an Ethernet frame drop error condition on Ethernet fabric 220.

In one or more embodiments, redundancy algorithm 207 may support a 1:3 redundancy mode and a 1:8 redundancy mode, among other redundancy modes. For example, when PIU module 204-1 utilizes redundancy algorithm 207 in 1:3 redundancy mode, redundancy algorithm 207 may generate parity information for three ODU samples in every three Ethernet packets 234. PIU module 204-1 may include the parity information in a fourth Ethernet packet 234. PIU module 204-1 may transmit the four Ethernet packets 234 of the Ethernet traffic to PIU module 204-2 over Ethernet fabric 220. PIU module 204-2 may receive at least three Ethernet packets 234 of the four Ethernet packets 234. PIU module 204-2 may determine whether the three Ethernet packets 234 including the three ODU samples, and the fourth Ethernet packet 234 including the parity information for the three ODU samples have been received. When PIU module 204-2 determines that only two Ethernet packets 234 including two ODU samples of the three Ethernet packets 234 and the fourth Ethernet packet 234 have been received, PIU module 204-2 may utilize redundancy algorithm 207 in 1:3 redundancy mode to reconstruct and recover the third ODU sample of the three ODU samples that was lost from the two ODU samples and the parity information received using XOR operations.

In another example, when PIU module 204-1 utilizes redundancy algorithm 207 in 1:8 redundancy mode, redundancy algorithm 207 may generate parity information for eight ODU samples in every eight Ethernet packets 234. PIU module 204-1 may include the parity information in a ninth Ethernet packet 234. PIU module 204-1 may transmit the nine Ethernet packets 234 of the Ethernet traffic to PIU module 204-2 over Ethernet fabric 220. PIU module 204-2 may receive at least eight Ethernet packets 234 of the nine Ethernet packets 234. PIU module 204-2 may determine whether the eight Ethernet packets 234 including the eight ODU samples, and the ninth Ethernet packet 234 including the parity information for the eight ODU samples have been received. When PIU module 204-2 determines that only seven Ethernet packets 234 including seven ODU samples of the eight Ethernet packets 234 and the ninth Ethernet packet 234 have been received, PIU module 204-2 may utilize redundancy algorithm 207 in 1:8 redundancy mode to reconstruct and recover the eighth ODU sample of the eight ODU samples that was lost from the seven ODU samples and the parity information received using XOR operations.

When redundancy algorithm is in either 1:3 or 1:8 redundancy modes, OTN switch 230 may be able to recover a lost Ethernet packet 234 due to an occurrence of bit error in working interconnections 222 or Ethernet switches 214 from the remaining Ethernet packets 234. This may allow OTN switch 230 to maintain a bit error rate less than or equal to 10 to the minus 12 ($10^{-12}$). When Ethernet fabric 220 only has three working interconnections 222, the overhead of the parity Ethernet packet 234 using redundancy algorithm in 1:3 redundancy mode may be significant and greater than the overhead of the parity Ethernet packet 234 using redundancy algorithm in 1:8 redundancy mode. Thus, to reduce the overhead of the parity Ethernet packet 234 and improve performance and efficiency for bit error detection and correction, redundancy algorithm in 1:8 redundancy mode may be utilized.

In FIG. 2, PIU blade chassis 202 may utilize an isolation algorithm 209 to determine a type and scope of a fault condition on Ethernet fabric 220. Isolation algorithm 209 is a distributed algorithm that a processor (not shown) of each PIU blade chassis 202 may run independently of each other to determine the type and scope of one or more fault conditions. A fault condition may be at least one of a single port single plane fault condition, a multiple port single plane fault condition on a single Ethernet fabric plane, and a multiple port multiple plane fault condition on multiple Ethernet fabric planes. A PIU blade chassis 202 may utilize message passing between all other PIU blade chassis 202 to quickly determine the type and scope of the one or more fault conditions and how to handle the fault conditions. A PIU blade chassis 202 may send a fault condition message to all other PIU blade chassis 202 using at least one protection interconnection 222. Using a protection interconnection 222 for message passing, avoids a working interconnection 222 that may be experiencing a fault condition and helps to ensure the fault condition message is received by the PIU blade chassis 202. For example, a fault condition may be a single port single plane fault condition that may be handled locally. As another example, a multiple port single plane fault condition on a single Ethernet fabric plane may need to be handled globally by all PIU blade chassis 202 in OTN switch 230. Each PIU blade chassis 202 may utilize one or more delays to minimize the number of fault condition messages sent from a particular PIU blade chassis 202 that detected a particular fault condition, which may avoid overwhelming each PIU blade chassis 202 and allow for increased performance of fault condition isolation and correction. Each PIU blade chassis 202 may handle all fault conditions detected by each PIU module 204 of PIU blade chassis 202 without the need to send multiple fault condition messages to all other PIU blade chassis 202 for each fault condition detected by the PIU modules 204 of PIU blade chassis 202. Fault condition detection and isolation using distributed isolation algorithm 209 is described in further detail herein.

Finally, in FIG. 2, an OTN switch network element controller 216 (see also FIGS. 6 and 7) is shown that coordinates operation of PIU blade chassis 202, PIU modules 204, and Ethernet fabric 220. OTN switch network element controller 214 may be a software-defined networking (SDN) controller, a micro-controller unit (MCU), a virtual micro-controller unit (vMCU), or various types of controllers. Specifically, functionality in the OTN switch network element controller 216 may be used to communicate with PIU chassis 202 and Ethernet fabric 220 for OTN switching operations. The OTN switch network element controller 216 may accordingly configure switching paths and switching configurations, using software commands, to enable operation of disaggregated OTN switching system 200 as an OTN switch 230.

In FIG. 2, during normal operation, PIU module 204-1 may receive ODUs 232-1, 232-2, and 232-3 from OTN 101. PIU module 204-1 may convert ODUs 232-1, 232-2, and 232-3 to Ethernet packets 234-1, 234-2, and 234-3. PIU module 204-1 may utilize redundancy algorithm 207 in 1:3 redundancy mode to generate parity information for Ethernet packets 234-1, 234-2, and 234-3. PIU module 204-1 may generate Ethernet packet 234-4 from the parity information for Ethernet packets 234-1, 234-2, and 234-3. Then, PIU module 204-1 may transmit Ethernet packet 234-1 to Ethernet fabric plane 212-1 using working interconnection 222-1, transmit Ethernet packet 234-2 to Ethernet fabric plane 212-1 using working interconnection 222-2, transmit Ethernet packet 234-3 to Ethernet fabric plane 212-2 using working interconnection 222-5, and transmit Ethernet packet 234-4 to Ethernet fabric plane 212-2 using working interconnection 222-6.

PIU module 204-2 may receive Ethernet packet 234-1 from Ethernet fabric plane 212-1 using working interconnection 222-7, receive Ethernet packet 234-2 from Ethernet fabric plane 212-1 using working interconnection 222-8, receive Ethernet packet 234-3 from Ethernet fabric plane 212-2 using working interconnection 222-11, and receive Ethernet packet 234-4 from Ethernet fabric plane 212-2 using working interconnection 222-12. PIU module 204-2 may receive at least 3 of the 4 Ethernet packets 234-1, 234-2, 234-3, and 234-4 from Ethernet fabric 220. PIU module 204-2 may utilize redundancy algorithm 207 in 1:3 redundancy mode to detect and correct for any bit errors that may have occurred after receiving at least three of Ethernet packets 234-1, 234-2, 234-3, and 234-4. Then, PIU module 204-2 may convert Ethernet packets 234-1, 234-2, and 234-3 to ODUs 232-1, 232-2, and 232-3 and transmit ODUs 232-1, 232-2, and 232-3 to OTN 101.

Figure 3:
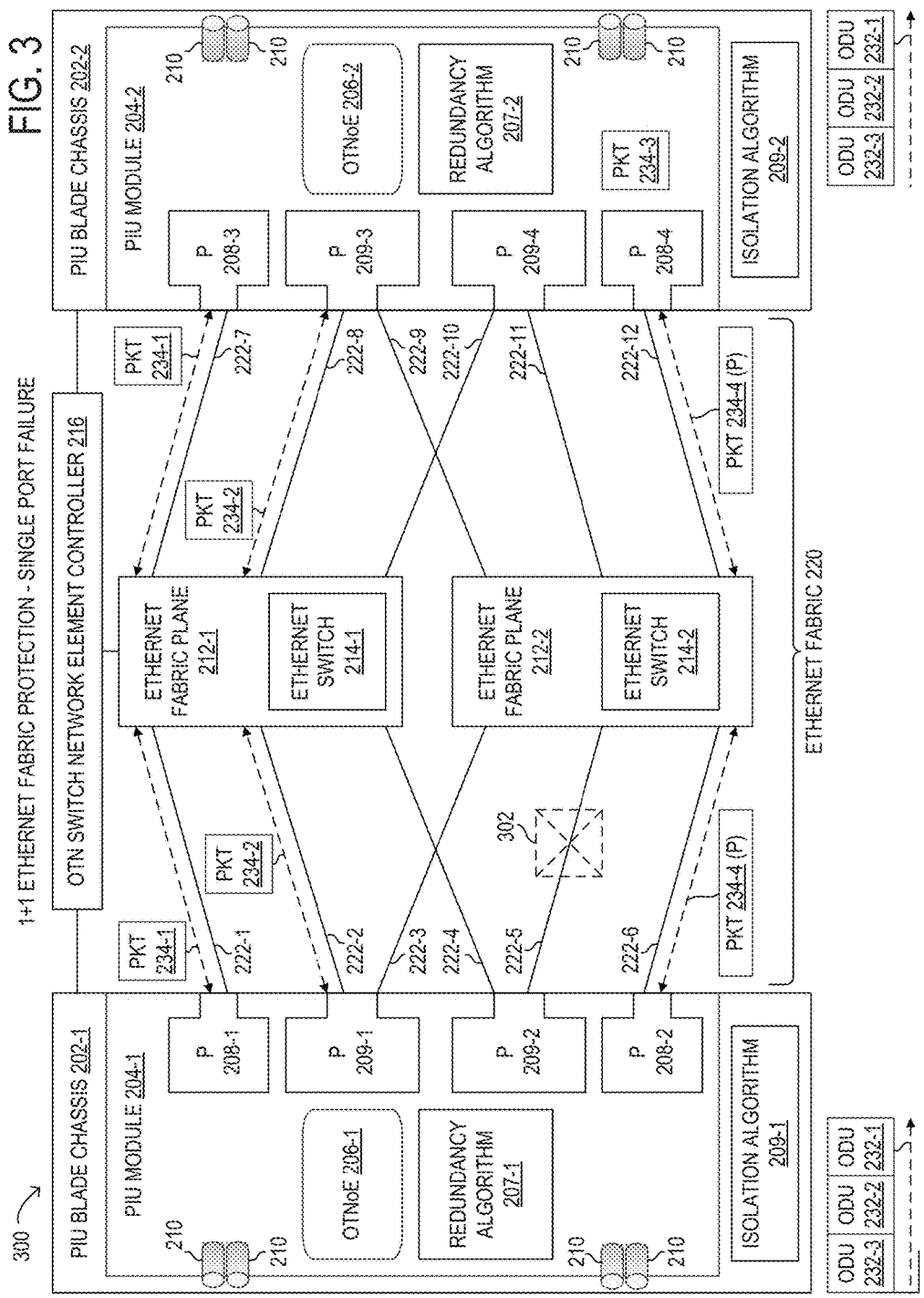
FIG. 3 is a block diagram of an example of Ethernet fabric protection in an embodiment of an OTN switching system.

Referring now to FIG. 3, a block diagram of an example of Ethernet fabric protection for an Ethernet single PIU port failure in an embodiment of an OTN switching system 300 is illustrated. PIU module 204-1 may configure a first configuration that may transmit Ethernet packets 234 to Ethernet fabric plane 212-1 using PIU port 208-1 via interconnect 222-1 and PIU port 209-1 via interconnect 222-2, and to Ethernet fabric plane 212-2 using PIU port 209-2 via interconnect 222-5 and PIU port 208-2 via interconnect 222-6. PIU module 204-1 may also configure redundancy algorithm 207-1 in 1:3 redundancy mode. Similarly, PIU module 204-2 may configure a third configuration that may receive Ethernet packets 234 from Ethernet fabric plane 212-1 using PIU port 208-2 via interconnect 222-7 and PIU port 209-3 via interconnect 222-8, and from Ethernet fabric plane 212-2 using PIU port 209-4 via interconnect 222-11 and PIU port 208-4 via interconnect 222-12. PIU module 204-1 may also configure redundancy algorithm 207-2 in 1:3 redundancy mode.

PIU module 204-1 may utilize redundancy algorithm 207-1 to generate parity information for Ethernet packets 234-1, 234-2, and 234-3. PIU module 204-1 may generate Ethernet packet 234-4 from the parity information for Ethernet packets 234-1, 234-2, and 234-3. PIU module 204-1 may transmit Ethernet packets 234-1 and 234-2 to Ethernet fabric plane 212-1 and Ethernet packets 234-3 and 234-4 to Ethernet fabric plane 212-2 using the first configuration. During transmission, PIU module 204-1 may detect a fault condition 302 on Ethernet fabric 220, which causes Ethernet packet 234-3 to be lost. Using isolation algorithm 209-1, PIU module 204-1 may determine that the fault condition 302 is a single port fault and is the only fault condition 302 on Ethernet fabric 220. Then, PIU module 204-1 may stop using PIU port 209-2 and interconnection 222-5 for Ethernet packet transmission. In parallel, PIU module 204-2 may receive Ethernet packets 234-1 and 234-2 from Ethernet fabric plane 212-1 and Ethernet packet 234-4 from Ethernet fabric plane 212-2 using the first configuration. PIU module 204-2 may recover Ethernet packet 234-3 from Ethernet packets 234-1, 234-2, and 234-4 using redundancy algorithm 207-2 as previously described.

Figure 4:
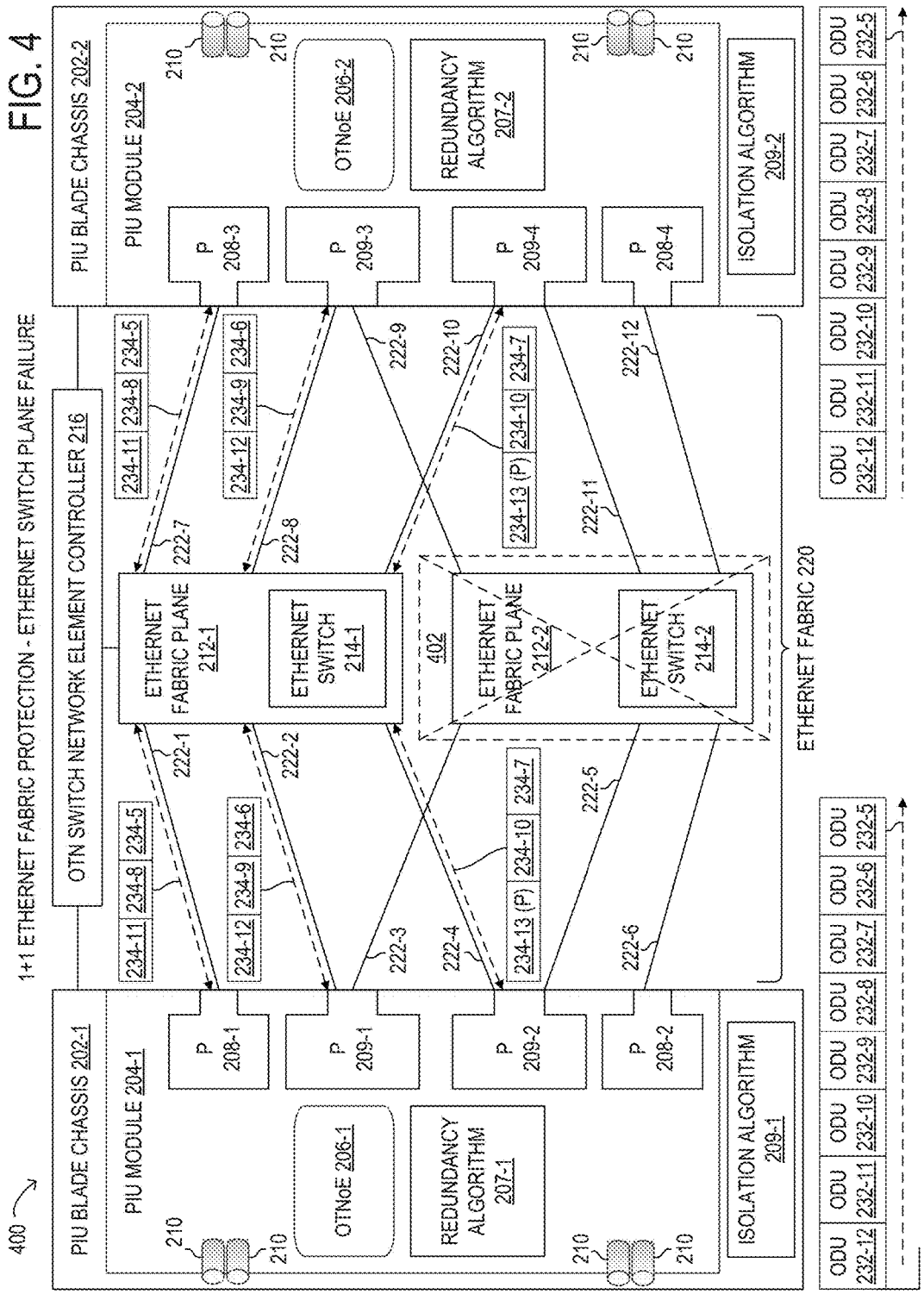
FIG. 4 is a block diagram of another example of Ethernet fabric protection in an embodiment of an OTN switching system.

Referring now to FIG. 4, a block diagram of an example of Ethernet fabric protection for an Ethernet fabric plane failure in an embodiment of an OTN switching system 300 is illustrated. PIU module 204-1 may configure a first configuration that may transmit Ethernet packets 234 to Ethernet fabric plane 212-1 using PIU port 208-1 via interconnect 222-1 and PIU port 209-1 via interconnect 222-2, and to Ethernet fabric plane 212-2 using PIU port 209-2 via interconnect 222-5 and PIU port 208-2 via interconnect 222-6. Similarly, PIU module 204-2 may configure a third configuration that may receive Ethernet packets 234 from Ethernet fabric plane 212-1 using PIU port 208-2 via interconnect 222-7 and PIU port 209-3 via interconnect 222-8, and from Ethernet fabric plane 212-2 using PIU port 209-4 via interconnect 222-11 and PIU port 208-4 via interconnect 222-12, as previously described with reference to FIG. 3.

During transmission, PIU module 204-1 may detect a fault condition 402 on Ethernet fabric 220, which causes Ethernet packets 234 sent over Ethernet fabric plane 212-2 to be lost. Using isolation algorithm 209-1, PIU chassis 202-1 and PIU chassis 202-2 may determine that the fault condition 402 is a multiple port single plane fault condition on Ethernet fabric plane 212-2.

PIU module 204-1 may switch interconnection 222-4 from a protection interconnection to a working interconnection, and switch interconnections 222-5 and 222-6 to non-working interconnections. Next, PIU module 204-1 may configure a second configuration that may transmit Ethernet packets 234 to Ethernet fabric plane 212-1 using PIU port 208-1 via working interconnect 222-1, PIU port 209-1 via working interconnect 222-2, and PIU port 209-2 via working interconnect 222-4. PIU module 204-1 may also configure redundancy algorithm 207-1 in 1:8 redundancy mode. Similarly, PIU module 204-2 may switch interconnection 222-10 from a protection interconnection to a working interconnection, and switch interconnections 222-11 and 222-12 to non-working interconnections. Next, PIU module 204-2 may configure a fourth configuration that may receive Ethernet packets 234 from Ethernet fabric plane 212-1 using PIU port 208-3 via working interconnect 222-7, PIU port 209-3 via working interconnect 222-8, and PIU port 209-4 via working interconnect 222-10. PIU module 204-2 may also configure redundancy algorithm 207-2 in 1:8 redundancy mode.

PIU module 204-1 may receive ODUs 232-5 through 232-12 from OTN 101. PIU module 204-1 may convert ODUs 232-5 through 232-12 to Ethernet packets 234-5 through 234-12. PIU module 204-1 may utilize redundancy algorithm 207-1 to generate parity information for Ethernet packets 234-5 through 234-12. PIU module 204-1 may generate Ethernet packet 234-13 from the parity information for Ethernet packets 234-5 through 234-12. PIU module 204-1 may transmit Ethernet packets 234-5, 234-8, and 234-11 to Ethernet fabric plane 212-1 using the second configuration, may transmit Ethernet packets 234-6, 234-9, and 234-12 to Ethernet fabric plane 212-1 using the second configuration, and may transmit Ethernet packets 234-7, 234-10 and 234-13 to Ethernet fabric plane 212-1 using the second configuration. Similarly, PIU module 204-2 may receive Ethernet packets 234-5, 234-8, and 234-11 from Ethernet fabric plane 212-1 using the second configuration, may receive Ethernet packets 234-6, 234-9, and 234-12 from Ethernet fabric plane 212-1 using the second configuration, and may receive Ethernet packets 234-7, 234-10 and 234-13 from Ethernet fabric plane 212-1 using the second configuration. PIU module 204-2 may detect and recover from any soft Ethernet PIU port errors for Ethernet packets 234-5 through 234-13 using redundancy algorithm 207-2 in 1:8 redundancy mode. PIU module 204-2 may convert Ethernet packets 234-5 through 234-12 to ODUs 232-5 through 232-12 and may transmit ODUs 232-5 through 232-12 to OTN 101.

Figure 5:
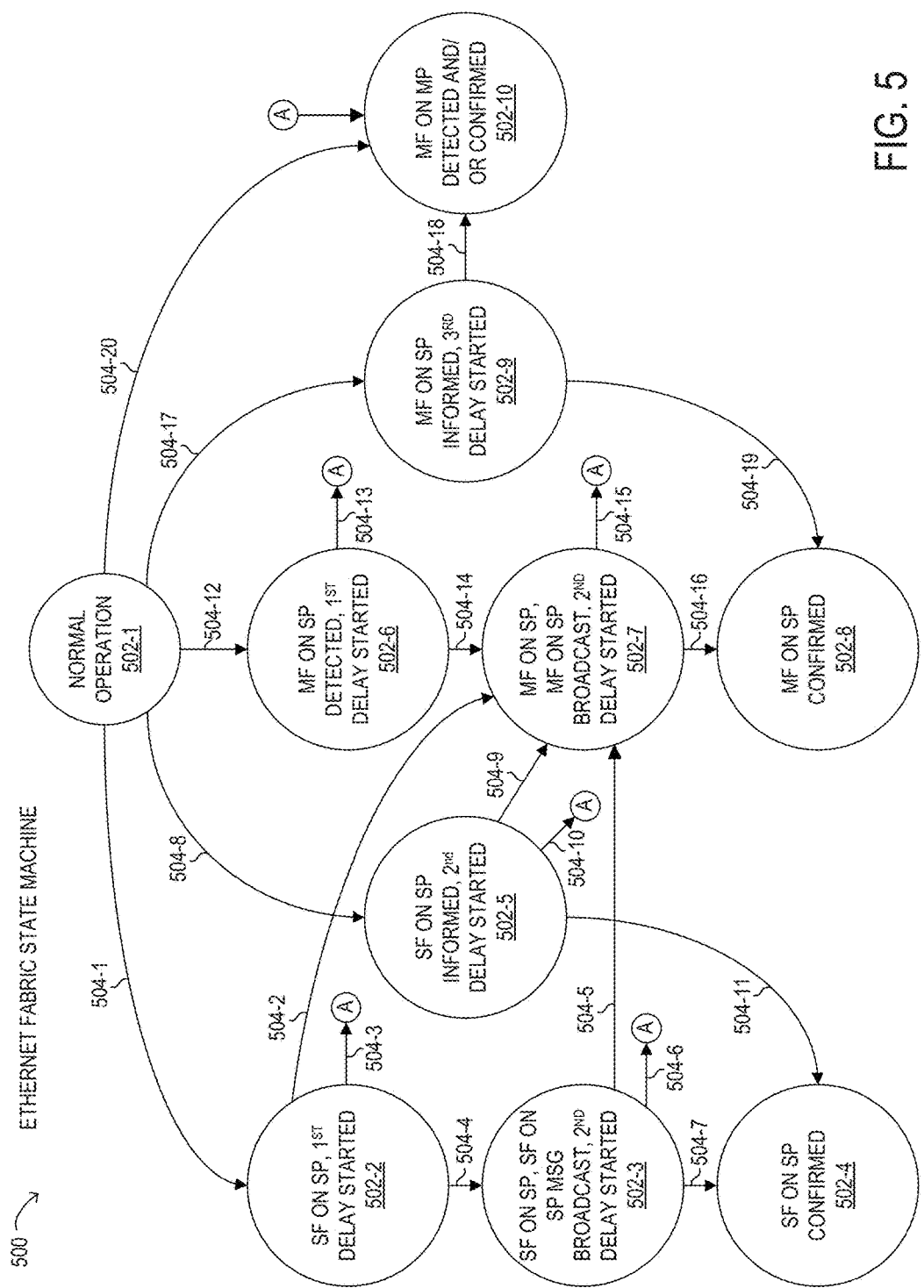
FIG. 5 is an embodiment of an Ethernet fabric state machine for a disaggregated OTN switching system using an Ethernet fabric protection method.

Referring now to FIG. 5, an Ethernet fabric state machine 500 is illustrated. Ethernet fabric state machine 500 describes states of Ethernet fabric 220 for performing an Ethernet fabric protection method, as described herein. In various embodiments, the Ethernet fabric protection method may be performed using disaggregated OTN switching system 200, and in particular by one or more PIU modules 204 executing isolation algorithm 209. In various embodiments, the Ethernet fabric protection method described herein may be implemented with fewer or more elements than depicted in Ethernet fabric state machine 500. It is noted that certain transitions between various Ethernet fabric states described in Ethernet fabric state machine 500 may be optional or may be rearranged in different embodiments.

In Ethernet fabric state machine 500, states 502 represent certain Ethernet fabric states of Ethernet fabric 220 during operation of disaggregated OTN switching system 200. In a normal operation state 502-1 of Ethernet fabric 220, PIU modules 204 may be transmitting Ethernet packets 234 over Ethernet fabric 220 to other PIU modules 204. PIU modules 204 may also be receiving Ethernet packets 234 from other PIU modules 204. During transmission of Ethernet packets 234, a PIU module 204 of a PIU blade processor 202, such as PIU module 204-1 of PIU blade chassis 202-1, may detect a single port single plane fault condition on a single Ethernet fabric plane 212 of Ethernet fabric 220, such as Ethernet fabric plane 212-1, at action 504-1, which may cause Ethernet fabric state machine 500 to transition from Ethernet fabric state 502-1 to Ethernet fabric state 502-2. In Ethernet fabric state 502-1, PIU module 204-1 of PIU blade chassis 202-1 may receive a single port single plane fault condition on a single Ethernet fabric plane on Ethernet fabric plane 212-1 from another PIU blade chassis 202 or from OTN switch network element controller 216, and no other fault conditions have been detected by a PIU module 204 of PIU blade chassis 202-1, at action 504-8, which may cause Ethernet fabric state machine 500 to transition from Ethernet fabric state 502-1 to Ethernet fabric state 502-5. In Ethernet fabric state 502-1, PIU module 204-1 of PIU blade chassis 202-1 may detect a multiple port single plane fault condition on single Ethernet fabric plane on Ethernet fabric plane 212-1, or detect a single port single plane fault condition on a single Ethernet fabric plane on Ethernet fabric plane 212-1 and receive at least one of a single port single plane fault condition on a single Ethernet fabric plane or a multiple port single plane fault condition on single Ethernet fabric plane from other PIU blade chassis 202 on the same Ethernet fabric plane 212-1, at action 504-12, which may cause Ethernet fabric state machine 500 to transition from Ethernet fabric state 502-1 to Ethernet fabric state 502-6. In Ethernet fabric state 502-1, PIU blade chassis 202-1 may receive at least one of a multiple port single plane fault condition on a single Ethernet fabric plane and multiple single port single plane fault conditions on a single Ethernet fabric plane from other PIU blade chassis 202 on the same Ethernet fabric plane 212-1, at action 504-17, which may cause Ethernet fabric state machine 500 to transition from Ethernet fabric state 502-1 to Ethernet fabric state 502-9. In Ethernet fabric state 502-1, one or more PIU modules 204 of PIU blade chassis 202-1 may detect a multiple port single plane fault condition on multiple Ethernet fabric planes, detect multiple single port single plane fault conditions on single Ethernet fabric planes on different Ethernet fabric planes, receive a multiple port multiple plane fault condition on multiple Ethernet fabric planes from other PIU blade chassis 202, and receive multiple single port single plane fault conditions on single Ethernet fabric planes on different Ethernet fabric planes from other PIU blade chassis 202, at action 504-20, which may cause Ethernet fabric state machine 500 to transition from Ethernet fabric state 502-1 to Ethernet fabric state 502-10.

In Ethernet fabric state 502-2, PIU blade chassis 202-1 and its associated PIU module 204-1 may not know if the single port single plane fault condition is the only fault condition 302 on Ethernet fabric plane 212-1. PIU blade chassis 202-1 may start a first delay associated with PIU module 204-1. In an embodiment, the first delay may be set to a random number between M and N. For example, M may be set to 50 micro seconds and N may be set to 100 micro seconds. During the first delay, one or more PIU modules 204 of PIU blade chassis 202-1 may detect one or more other single port single plane fault conditions on Ethernet fabric plane 212-1, detect one or more multiple port single plane fault conditions on Ethernet fabric plane 212-1, receive one or more other single port single plane fault conditions on Ethernet fabric plane 212-1 from at least one other PIU blade chassis 202, and receive one or more multiple port single plane fault conditions on Ethernet fabric plane 212-1 from at least one other PIU blade chassis 202, at action 504-2. In response to the detection or the reception at action 504-2, Ethernet fabric state machine 500 may transition from Ethernet fabric state 502-2 to Ethernet fabric state 502-7. During the first delay, one or more PIU modules 204 of PIU blade chassis 202-1 may detect one or more other single port single plane fault conditions on at least one other Ethernet fabric plane 212, one or more multiple port single plane fault conditions on at least one other Ethernet fabric plane 212, and one or more multiple port multiple plane fault conditions, and may receive one or more other single port single plane fault conditions, one or more multiple port single plane fault conditions on at least one other Ethernet fabric plane 212, and one or more multiple port multiple plane fault conditions from at least one other PIU blade chassis 202, at action 504-3. In response to the detection or the reception at action 504-3, Ethernet fabric state machine 500 may transition from Ethernet fabric state 502-2 to Ethernet fabric state 502-10. In the case that the first delay has expired without one or more PIU modules 204 of PIU blade chassis 202-1 detecting another fault condition and without PIU blade controller 202-1 receiving any other fault conditions from any other PIU blade chassis 202, at action 504-4, Ethernet fabric state machine 500 may transition from Ethernet fabric state 502-2 to Ethernet fabric state 502-3.

In Ethernet fabric state 502-3, PIU blade chassis 202-1 may broadcast the single port single plane fault condition on Ethernet fabric plane 212-1 to all other PIU blade chassis 202 to inform the other PIU blade chassis 202 of the single port single plane fault condition. PIU blade chassis 202-1 may also start a second delay associated with PIU module 204-1. In an embodiment, the second delay may be set to a number equal to (2*N). For example, N may be set as above. During the second delay, one or more PIU modules 204 of PIU blade chassis 202-1 may detect one or more other single port single plane fault conditions on Ethernet fabric plane 212-1, detect one or more multiple port single plane fault conditions on Ethernet fabric plane 212-1, receive one or more other single port single plane fault conditions on Ethernet fabric plane 212-1 from at least one other PIU blade chassis 202, and receive one or more multiple port single plane fault conditions on Ethernet fabric plane 212-1 from at least one other PIU blade chassis 202, at action 504-5. In response to the detection or the reception at action 504-5, Ethernet fabric state machine 500 may transition from Ethernet fabric state 502-3 to Ethernet fabric state 502-7. During the second delay, one or more PIU modules 204 of PIU blade chassis 202-1 may detect one or more other single port single plane fault conditions, one or more multiple port single plane fault conditions on at least one other Ethernet fabric plane 212, and one or more multiple port multiple plane fault conditions, and may receive one or more other single port single plane fault conditions, one or more multiple port single plane fault conditions on at least one other Ethernet fabric plane 212, and one or more multiple port multiple plane fault conditions from at least one other PIU blade chassis 202, at action 504-6. In response to the detection or the reception at action 504-6, Ethernet fabric state machine 500 may transition from Ethernet fabric state 502-3 to Ethernet fabric state 502-10. In the case that the second delay has expired without one or more PIU modules 204 of PIU blade chassis 202-1 detecting another fault condition and without PIU blade controller 202-1 receiving any other fault conditions from any other PIU blade chassis 202, at action 504-7, Ethernet fabric state machine 500 may transition from Ethernet fabric state 502-3 to Ethernet fabric state 502-4.

In Ethernet fabric state 502-4, the single port single plane fault condition on Ethernet fabric plane 212-1 is confirmed to be the only fault condition on Ethernet fabric plane 212-1 of Ethernet fabric 220 by PIU blade chassis 202-1.

In Ethernet fabric state 502-5, upon receiving the single port single plane fault condition on Ethernet fabric plane 212-1, PIU blade chassis 202-2 may start a second delay associated with PIU blade chassis 202-2. In an embodiment, the second delay associated with PIU blade chassis 202-2 may be set to a number equal to (2*N). For example, N may be set as above. During the second delay, one or more PIU modules 204 of PIU blade chassis 202-2 may detect one or more other single port single plane fault conditions on Ethernet fabric plane 212-1, detect one or more multiple port single plane fault conditions on Ethernet fabric plane 212-1, receive one or more other single port single plane fault conditions on Ethernet fabric plane 212-1 from at least one other PIU blade chassis 202, and receive one or more multiple port single plane fault conditions on Ethernet fabric plane 212-1 from at least one other PIU blade chassis 202, at action 504-9. In response to the detection or the reception at action 504-9, Ethernet fabric state machine 500 may transition from Ethernet fabric state 502-5 to Ethernet fabric state 502-7. During the second delay, one or more PIU modules 204 of PIU blade chassis 202-2 may detect one or more other single port single plane fault conditions, one or more multiple port single plane fault conditions on at least one other Ethernet fabric plane 212, and one or more multiple port multiple plane fault conditions, and may receive one or more other single port single plane fault conditions, one or more multiple port single plane fault conditions on at least one other Ethernet fabric plane 212, and one or more multiple port multiple plane fault conditions from at least one other PIU blade chassis 202, at action 504-10. In response to the detection or the reception at action 504-10, Ethernet fabric state machine 500 may transition from Ethernet fabric state 502-5 to Ethernet fabric state 502-10. In the case that the second delay has expired without one or more PIU modules 204 of PIU blade chassis 202-2 detecting another fault condition and without PIU blade chassis 202-2 receiving any other fault conditions from any other PIU blade chassis 202, at action 504-11, Ethernet fabric state machine 500 may transition from Ethernet fabric state 502-5 to Ethernet fabric state 502-4.

In Ethernet fabric state 502-6, upon receiving the multiple port single plane fault condition on Ethernet fabric plane 212-1, PIU blade chassis 202-2 may start a first delay associated with PIU blade chassis 202-2. In an embodiment, the first delay may be set to a random number between M and N. For example, M and N may be set as above. During the first delay, one or more PIU modules 204 of PIU blade chassis 202-2 may detect one or more other single port single plane fault conditions, one or more multiple port single plane fault conditions on at least one other Ethernet fabric plane 212, and one or more multiple port multiple plane fault conditions, and may receive one or more other single port single plane fault conditions, one or more multiple port single plane fault conditions on at least one other Ethernet fabric plane 212, and one or more multiple port multiple plane fault conditions from at least one other PIU blade chassis 202, at action 504-13. In response to the detection or the reception at action 504-13, Ethernet fabric state machine 500 may transition from Ethernet fabric state 502-6 to Ethernet fabric state 502-10. In the case that the first delay has expired without one or more PIU modules 204 of PIU blade chassis 202-2 detecting another fault condition and without PIU blade chassis 202-2 receiving any other fault conditions from any other PIU blade chassis 202, at action 504-14, Ethernet fabric state machine 500 may transition from Ethernet fabric state 502-6 to Ethernet fabric state 502-7.

In Ethernet fabric state 502-7, upon receiving the multiple port single plane fault condition on Ethernet fabric plane 212-1, PIU blade chassis 202-2 may start a second delay associated with PIU blade chassis 202-2. In an embodiment, the second delay associated with PIU blade chassis 202-2 may be set to a number equal to (2*N). For example, N may be set as above. During the second delay, one or more PIU modules 204 of PIU blade chassis 202-2 may detect one or more other single port single plane fault conditions, one or more multiple port single plane fault conditions on at least one other Ethernet fabric plane 212, and one or more multiple port multiple plane fault conditions, and may receive one or more other single port single plane fault conditions, one or more multiple port single plane fault conditions on at least one other Ethernet fabric plane 212, and one or more multiple port multiple plane fault conditions from at least one other PIU blade chassis 202, at action 504-15. In response to the detection or the reception at action 504-15, Ethernet fabric state machine 500 may transition from Ethernet fabric state 502-7 to Ethernet fabric state 502-10. In the case that the second delay has expired without one or more PIU modules 204 of PIU blade chassis 202-2 detecting any fault condition on another Ethernet fabric plane 212-2 and without PIU blade chassis 202-2 receiving any fault condition on another Ethernet fabric plane 212-2, at action 504-16, Ethernet fabric state machine 500 may transition from Ethernet fabric state 502-7 to Ethernet fabric state 502-8.

In Ethernet fabric state 502-8, the multiple port single plane fault condition on Ethernet fabric plane 212-1 is confirmed to be the only fault condition on Ethernet fabric plane 212-1 of Ethernet fabric 220 by PIU blade chassis 202-2.

In Ethernet fabric state 502-9, upon receiving the multiple port single plane fault condition on Ethernet fabric plane 212-1, PIU blade chassis 202-2 may start a third delay associated with PIU blade chassis 202-2. In an embodiment, the third delay associated with PIU blade chassis 202-2 may be set to a number equal to (4*N). For example, N may be set as above. The first delay, the second delay, and the third delay may each be implemented using a timer, a delay device, or another mechanism. During the third delay, one or more PIU modules 204 of PIU blade chassis 202-2 may detect one or more other single port single plane fault conditions, one or more multiple port single plane fault conditions on at least one other Ethernet fabric plane 212, and one or more multiple port multiple plane fault conditions, and may receive one or more other single port single plane fault conditions, one or more multiple port single plane fault conditions on at least one other Ethernet fabric plane 212, and one or more multiple port multiple plane fault conditions from at least one other PIU blade chassis 202, at action 504-18. In response to the detection or the reception at action 504-18, Ethernet fabric state machine 500 may transition from Ethernet fabric state 502-9 to Ethernet fabric state 502-10. In the case that the third delay has expired without one or more PIU modules 204 of PIU blade chassis 202-2 detecting any fault condition on another Ethernet fabric plane 212-2 and without PIU blade chassis 202-2 receiving any fault conditions on another Ethernet fabric plane 212-2, at action 504-19, Ethernet fabric state machine 500 may transition from Ethernet fabric state 502-9 to Ethernet fabric state 502-8.

In Ethernet fabric state 502-10, a multiple port multiple plane fault condition has been detected and/or has been confirmed on more than one Ethernet fabric plane 212, such as, for example Ethernet fabric plane 212-1 and 212-2. PIU blade chassis 202-2 may send a multiple port multiple plane fault condition alarm message to OTN switch network element controller 216. PIU blade chassis 202-2 may remain in Ethernet fabric state 502-10 until the multiple port multiple plane fault condition has been resolved.

By having PIU blade chassis 202 of disaggregated OTN switching system 200 perform 1+1 Ethernet fabric protection in this distributed manner, the efficiency of determining the type and scope of one or more fault conditions and how to handle the fault conditions may be improved. Performing 1+1 Ethernet fabric protection in this manner may also minimize the amount of fault condition messages over Ethernet fabric 220 and may further improve fault condition isolation and resolution performance.

Figure 6:
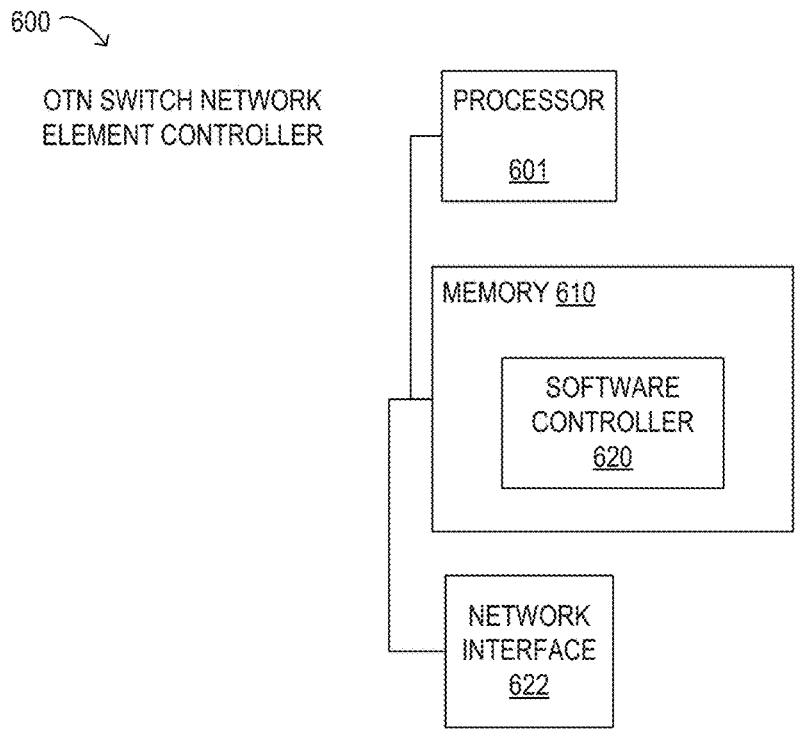
FIGS. 6 and 7 are block diagrams of selected elements of an embodiment of an OTN switch network element controller.

Referring now to FIG. 6, a block diagram of selected elements of an embodiment of OTN switch network element controller 600 is illustrated. OTN switch network element controller 600 in FIG. 6 may be implemented to control disaggregated OTN switching system 200 (see FIG. 2) and is a schematic diagram for descriptive purposes.

In FIG. 6, OTN switch network element controller 600 is represented as a computer system including physical and logical components for implementing disaggregated OTN switching system 200, as described herein, and may accordingly include processor 601, memory 610, and network interface 622. Processor 601 may represent one or more individual processing units and may execute program instructions, interpret data, process data stored by memory 610 or OTN Switch Network Element Controller 600. It is noted that OTN switch network element controller 600 may be implemented in different embodiments. For example, in some embodiments, OTN switch network element controller 600 may be implemented using a network element. In particular embodiments, memory 610 may represent a software controller 620 executing on processor 601.

In FIG. 6, memory 610 may be communicatively coupled to processor 601 and may comprise a system, device, or apparatus suitable to retain program instructions or data for a period of time (e.g., computer-readable media). Memory 610 may include various types of components and devices, such as random access memory (RAM), electrically erasable programmable read-only memory (EEPROM), a PCMCIA card, flash memory, solid state disks, hard disk drives, magnetic tape libraries, optical disk drives, magneto-optical disk drives, compact disk drives, compact disk arrays, disk array controllers, or any suitable selection or array of volatile or non-volatile memory. Non-volatile memory refers to a memory that retains data after power is turned off. It is noted that memory 610 may include different numbers of physical storage devices, in various embodiments. As shown in FIG. 6, memory 610 may include software controller 620, among other applications or programs available for execution.

Figure 7:
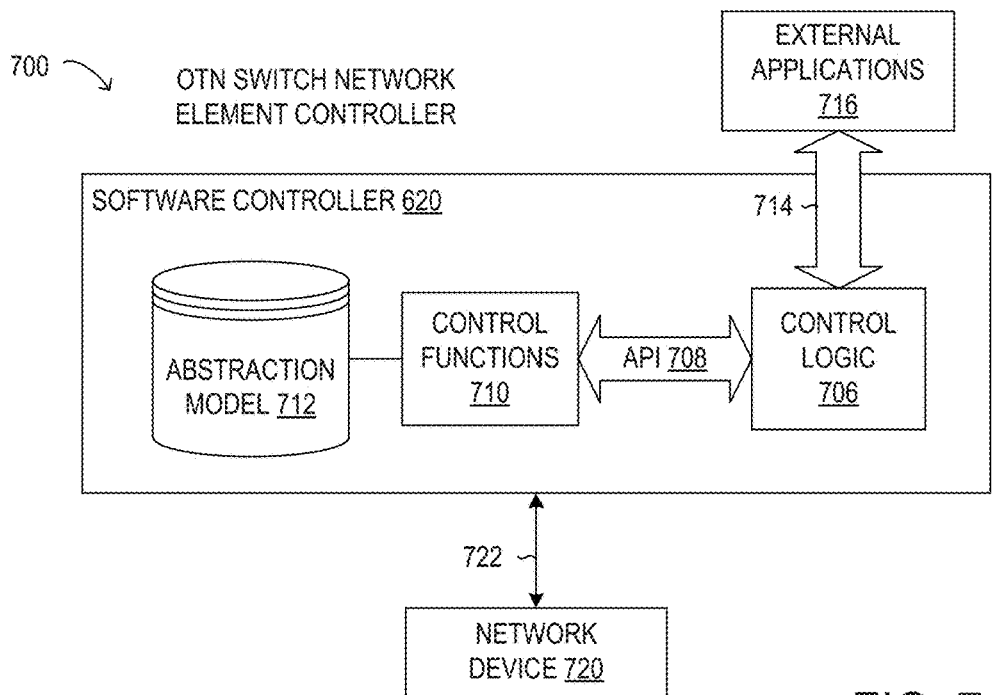

Referring now to FIG. 7, a block diagram of selected elements of an embodiment of OTN switch network element controller 700 is illustrated. FIG. 7 shows further details of software controller 620 for performing SDN operations related to disaggregated OTN switching system 200, as described above.

In FIG. 7, software controller 620 is shown including a repository that may store any of various different abstraction models 712, selected as examples among other abstraction models for descriptive clarity. In some embodiments, abstractions models 712 are defined using YANG, which is a data modeling language for modeling configuration and state data used to manage network devices through a network configuration protocol (NETCONF). Specifically, abstraction model 712 may include a service abstraction model that may model configuration and state data for network services used with optical transport network 101. Abstraction model 712 may include a network abstraction model that may model configuration and state data for network connections used with optical transport network 101. Abstraction model 712 may include a device abstraction model that may model configuration and state data for network devices 720 used in optical transport network 101. Control functions 710 may represent various control functions for network services, network connections, and network devices 720. API 708 may enable control logic 706 to access control functions 710 for network services, network connections, and network devices 720.

As shown in OTN switch network element controller 700, API 714 may enable communication between control logic 706, as well as external applications 716. Some non-limiting examples of external applications 716 that may be used with software controller 320 include orchestrators (NCX, Anuta Networks, Inc., Milpitas, Calif., USA; Exanova Service Intelligence, CENX, Ottawa, Canada), workflow managers (Salesforce Service Cloud, salesforce.com, Inc., San Francisco, Calif., USA; TrackVia, TrackVia, Inc., Denver, Colo., USA; Integrify, Integrify Inc., Chicago, Ill., USA); and analytics applications (Cloud Analytics Engine, Juniper Networks, Inc., Sunnyvale, Calif., USA; Nuage Networks Virtualized Services Directory (VSD), Nokia Solutions and Networks Oy, Espoo, Finland).

In implementations of OTN switch network element controller 700, control logic 706 may comprise internal control logic that remains proprietary, internal, or administratively protected within software controller 620. Non-limiting examples of internal or protected portions of control logic 706 may include complex proprietary algorithms, such as for path computation, and private business logic, such as billing algorithms of the network operator. In disaggregated OTN switching system 200, control logic 706 may include functionality for communicating with PIU chassis 202 and Ethernet fabric 220, as described above.

Furthermore, software controller 620 may interact with various network devices 720 using different network protocols. For example, software controller 620 may interact with network device 720 using software protocol 722 that is a NETCONF protocol, a command line interface (CLI), or a simple network management protocol (SNMP). Network devices 720 may represents routers, switches, or network elements that are included in optical transport network 101. As noted above, network abstraction models 712 may be repositories, such as databases with representations of functions supported by software controller 620, while the actual implementation of the functions is performed by control functions 710. Accordingly, control functions 710 may utilize the different software protocols 722 to access network devices 720.

It is noted that network devices 720 and software protocols 722 are shown in a logical view in FIG. 7 not a physical view. The actual physical connections between network devices 720 and software controller 620 may be different in different embodiments, such as using one or more network connections.

Figure 8:
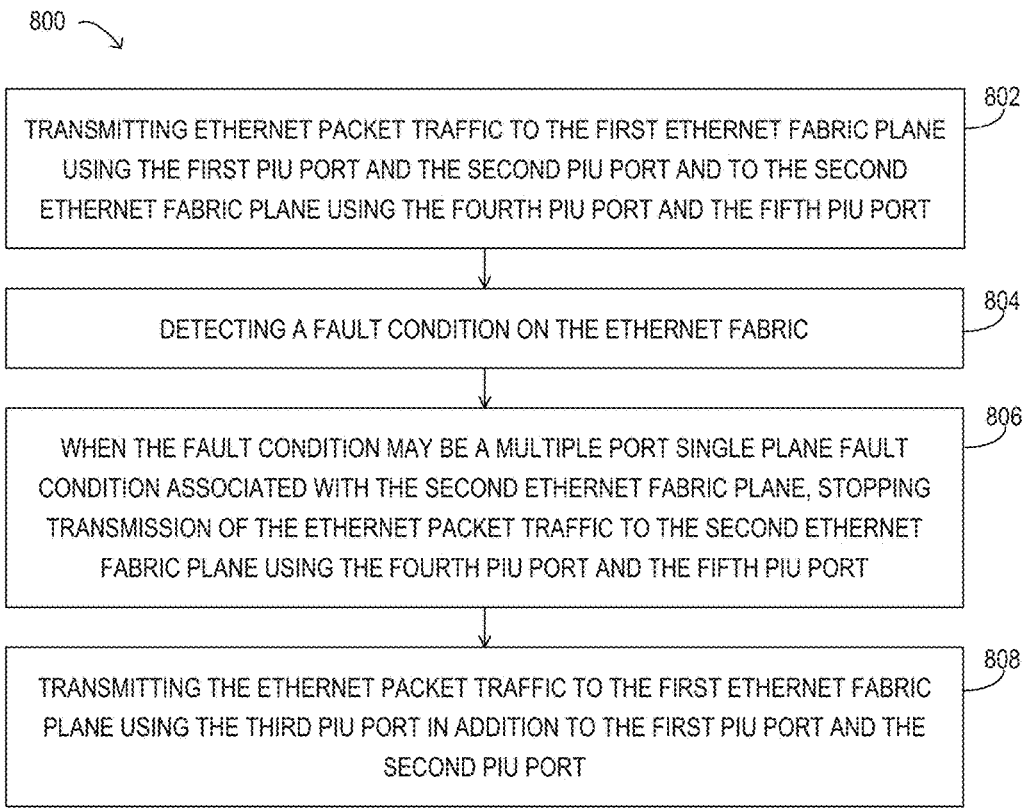
FIG. 8 is a flowchart of selected elements of an embodiment of a method for Ethernet fabric protection in a disaggregated OTN switching system.

Referring now to FIG. 8, a flowchart of selected elements of an embodiment of a method 800 for Ethernet fabric protection in a disaggregated OTN switching system, as described herein, is depicted. In various embodiments, method 500 may be performed using OTN switching systems 200, 300, and 500. It is noted that certain operations described in method 800 may be optional or may be rearranged in different embodiments.

The disaggregated OTN switching system of method 800 may include an OTN switch. The OTN switch may include an Ethernet fabric having a plurality of Ethernet fabric planes, each of the Ethernet fabric planes may include a corresponding Ethernet switch of a plurality of Ethernet switches. The OTN switch may further include a plurality of plug-in universal (PIU) modules that each may have a plurality of PIU ports including a first PIU module. A first PIU port, a second PIU port, and a third PIU port of each of the plurality of PIU modules may be connected to a first Ethernet switch of a first Ethernet fabric plane of the Ethernet fabric, and a fourth PIU port, a fifth PIU port, and a sixth PIU port of each of the plurality of PIU modules may be connected to a second Ethernet switch of a second Ethernet fabric plane of the Ethernet fabric.

Method 800 may begin at step 802, by transmitting, by the first PIU module, Ethernet packet traffic to the first Ethernet fabric plane using the first PIU port and the second PIU port and to the second Ethernet fabric plane using the fourth PIU port and the fifth PIU port. At step 804, detecting, by the first PIU module, a fault condition on the Ethernet fabric. At step 806, when the fault condition may be a multiple port single plane fault condition associated with the second Ethernet fabric plane, stopping, by the first PIU module, transmission of the Ethernet packet traffic to the second Ethernet fabric plane using the fourth PIU port and the fifth PIU port. At step 808, transmitting, by the first PIU module, the Ethernet packet traffic to the first Ethernet fabric plane using the third PIU port in addition to the first PIU port and the second PIU port.

As disclosed herein, methods and systems for Ethernet fabric protection in a disaggregated OTN switching system that include PIU modules each having multiple ports for OTN to Ethernet transceiving and an Ethernet fabric as a switching core are disclosed. An OTN over Ethernet module in each of the PIU modules may enable various OTN functionality to be realized using the Ethernet fabric which may include multiple Ethernet fabric planes. A first PIU module may transmit Ethernet packets using a first working port of the first PIU module over a first Ethernet fabric plane and may transmit Ethernet packets using a second working port of the first PIU module over a second Ethernet fabric plane. When the first PIU module detects a fault condition on the second Ethernet fabric plane, the first PIU module may transmit Ethernet packets using a third protection port of the first PIU module over the first Ethernet fabric plane instead of using the second working port.

The above disclosed subject matter is to be considered illustrative, and not restrictive, and the appended claims are intended to cover all such modifications, enhancements, and other embodiments which fall within the true spirit and scope of the present disclosure. Thus, to the maximum extent allowed by law, the scope of the present disclosure is to be determined by the broadest permissible interpretation of the following claims and their equivalents, and shall not be restricted or limited by the foregoing detailed description.

What is claimed is:

1. An optical transport network (OTN) switch comprising:
   an Ethernet fabric having a plurality of Ethernet fabric planes, each of the Ethernet fabric planes includes a corresponding Ethernet switch of a plurality of Ethernet switches; and
   a plurality of plug-in universal (PIU) modules each having a plurality of PIU ports including a first PIU module, wherein a first PIU port, a second PIU port, and a third PIU port of each of the plurality of PIU modules is connected to a first Ethernet switch of a first Ethernet fabric plane of the Ethernet fabric, and wherein a fourth PIU port, a fifth PIU port, and a sixth PIU port of each of the plurality of PIU modules is connected to a second Ethernet switch of a second Ethernet fabric plane of the Ethernet fabric,
   the first PIU module to:
      transmit Ethernet packet traffic to the first Ethernet fabric plane using the first PIU port and the second PIU port and to the second Ethernet fabric plane using the fourth PIU port and the fifth PIU port;
      detect a fault condition on the Ethernet fabric; and
      when the fault condition is a multiple port single plane fault condition associated with the second Ethernet fabric plane:
         stop transmission of the Ethernet packet traffic to the second Ethernet fabric plane using the fourth PIU port and the fifth PIU port; and
         transmit the Ethernet packet traffic to the first Ethernet fabric plane using the third PIU port in addition to the first PIU port and the second PIU port.

2. The OTN switch of claim 1, prior to the detection of the fault condition, the first PIU module further to:
   generate parity information for optical data unit (ODU) samples in every three Ethernet packets of the Ethernet packet traffic using exclusive or (XOR) operations that is included in a corresponding fourth Ethernet packet of the Ethernet packet traffic.

3. The OTN switch of claim 1, further comprising:
   a second PIU module, the second PIU module to:
      receive the Ethernet packet traffic from the Ethernet fabric;
      determine whether three Ethernet packets including three ODU samples of the Ethernet packet traffic, and a fourth Ethernet packet including parity information for the three ODU samples of the Ethernet packet traffic have been received; and
      when only two Ethernet packets including two ODU samples of the three Ethernet packets and the fourth Ethernet packet have been received,
      recover a third ODU sample of the three ODU samples from the two ODU samples and the parity information received using XOR operations.

4. The OTN switch of claim 1, after the detection of the fault condition, the first PIU module further to:
   generate parity information for ODU samples in every eight Ethernet packets of the Ethernet packet traffic using XOR operations that is included in a corresponding ninth Ethernet packet of the Ethernet packet traffic.

5. The OTN switch of claim 1, when the fault condition is a single port single plane fault condition associated with the fourth PIU port on the Ethernet fabric, the first PIU module further to:
   stop transmission of the Ethernet packet traffic to the second Ethernet fabric plane using the fourth PIU port.

6. The OTN switch of claim 1, further comprising:
   a second PIU module, the second PIU module to:
      when the fault condition is the multiple port single plane fault condition associated with the second Ethernet fabric plane:
         stop reception of the Ethernet packet traffic from the second Ethernet fabric plane using the fourth PIU port and the fifth PIU port of the second PIU module; and
         receive the Ethernet packet traffic from the first Ethernet fabric plane using the third PIU port in addition to the first PIU port and the second PIU port of the second PIU module.

7. The OTN switch of claim 1, when the fault condition detected is the multiple port single plane fault condition associated with the second Ethernet fabric plane, the first PIU module further to:
   after expiration of a first delay associated with the first PIU module, transmit the multiple port single plane fault condition associated with the second Ethernet fabric plane to other PIU modules of the plurality of PIU modules using the first Ethernet fabric plane; and
   after expiration of a second delay associated with the first PIU module, when there is no occurrence of other fault conditions on the first Ethernet fabric plane, confirm the multiple port single plane fault condition associated with the second Ethernet fabric plane, wherein the expiration of the second delay is after the expiration of the first delay.

8. The OTN switch of claim 1, when the fault condition detected is a single port single plane fault condition associated with the fourth PIU port and the second Ethernet fabric plane, the first PIU module further to:
   after expiration of a first delay associated with the first PIU module, transmit the single port single plane fault condition associated with the fourth PIU port and the second Ethernet fabric plane to other PIU modules of the plurality of PIU modules using one of the fifth PIU port and the first Ethernet fabric plane; and
   after expiration of a second delay associated with the first PIU module, when there is no occurrence of other fault conditions on the first Ethernet fabric plane, confirm the single port single plane fault condition associated with the fourth PIU port and the second Ethernet fabric plane, wherein the expiration of the second delay is after the expiration of the first delay.

9. The OTN switch of claim 1, when the fault condition detected is a single port single plane fault condition associated with the fourth PIU port and the second Ethernet fabric plane, the first PIU module to:
after expiration of a first delay associated with the first PIU module, transmit the single port single plane fault condition associated with the fourth PIU port and the second Ethernet fabric plane to other PIU modules of the plurality of PIU modules using one of the fifth PIU port and the first Ethernet fabric plane; and
during a second delay associated with the first PIU module, when there is an occurrence of other fault conditions on the second Ethernet fabric plane, transmit the multiple port single plane fault condition associated with the second Ethernet fabric plane to the other PIU modules using the first Ethernet fabric plane, wherein the second delay is after the expiration of the first delay.

10. The OTN switch of claim 9, wherein the occurrence of other fault conditions on the second Ethernet fabric plane includes at least one of a second single port single plane fault condition associated with the second Ethernet fabric plane detected by the first PIU module, a second multiple port single plane fault condition associated with the second Ethernet fabric plane detected by the first PIU module, a third single port single plane fault condition associated with the second Ethernet fabric plane received from one of the other PIU modules, and a third multiple port single plane fault condition associated with the second Ethernet fabric plane received from one of the other PIU modules.

11. A method for Ethernet fabric protection comprising:
in an OTN switch comprising:
an Ethernet fabric having a plurality of Ethernet fabric planes, each of the Ethernet fabric planes includes a corresponding Ethernet switch of a plurality of Ethernet switches; and
a plurality of plug-in universal (PIU) modules each having a plurality of PIU ports including a first PIU module, wherein a first PIU port, a second PIU port, and a third PIU port of each of the plurality of PIU modules is connected to a first Ethernet switch of a first Ethernet fabric plane of the Ethernet fabric, and wherein a fourth PIU port, a fifth PIU port, and a sixth PIU port of each of the plurality of PIU modules is connected to a second Ethernet switch of a second Ethernet fabric plane of the Ethernet fabric, the method comprising:
transmitting, by the first PIU module, Ethernet packet traffic to the first Ethernet fabric plane using the first PIU port and the second PIU port and to the second Ethernet fabric plane using the fourth PIU port and the fifth PIU port;
detecting, by the first PIU module, a fault condition on the Ethernet fabric; and
when the fault condition is a multiple port single plane fault condition associated with the second Ethernet fabric plane:
stopping, by the first PIU module, transmission of the Ethernet packet traffic to the second Ethernet fabric plane using the fourth PIU port and the fifth PIU port; and
transmitting, by the first PIU module, the Ethernet packet traffic to the first Ethernet fabric plane using the third PIU port in addition to the first PIU port and the second PIU port.

12. The method of claim 11, further comprising, prior to detecting the fault condition:
generating parity information for optical data unit (ODU) samples in every three Ethernet packets of the Ethernet packet traffic using exclusive or (XOR) operations that is included in a corresponding fourth Ethernet packet of the Ethernet packet traffic.

13. The method of claim 11, further comprising:
receiving, by a second PIU module of the plurality of PIU modules, the Ethernet packet traffic from the Ethernet fabric;
determining whether three Ethernet packets including three ODU samples of the Ethernet packet traffic, and a fourth Ethernet packet including parity information for the three ODU samples of the Ethernet packet traffic have been received; and
when only two Ethernet packets including two ODU samples of the three Ethernet packets and the fourth Ethernet packet have been received,
recovering a third ODU sample of the three ODU samples from the two ODU samples and the parity information received using XOR operations.

14. The method of claim 11, further comprising, after detecting the fault condition:
generating parity information for ODU samples in every eight Ethernet packets of the Ethernet packet traffic using XOR operations that is included in a corresponding ninth Ethernet packet of the Ethernet packet traffic.

15. The method of claim 11, further comprising, when the fault condition is a single port single plane fault condition associated with the fourth PIU port on the Ethernet fabric:
stopping transmission of the Ethernet packet traffic to the second Ethernet fabric plane using the fourth PIU port.

16. The method of claim 11, further comprising, when the fault condition is the multiple port single plane fault condition associated with the second Ethernet fabric plane:
stopping, by a second PIU module of the plurality of PIU modules, reception of the Ethernet packet traffic from the second Ethernet fabric plane using the fourth PIU port and the fifth PIU port of the second PIU module; and
receiving, by the second PIU module, the Ethernet packet traffic from the first Ethernet fabric plane using the third PIU port in addition to the first PIU port and the second PIU port of the second PIU module.

17. The method of claim 11, further comprising, when the fault condition detected is the multiple port single plane fault condition associated with the second Ethernet fabric plane:
after expiration of a first delay associated with the first PIU module, transmitting the multiple port single plane fault condition associated with the second Ethernet fabric plane to other PIU modules of the plurality of PIU modules using the first Ethernet fabric plane; and
after expiration of a second delay associated with the first PIU module, when there is no occurrence of other fault conditions on the first Ethernet fabric plane, confirming the multiple port single plane fault condition associated with the second Ethernet fabric plane, wherein the expiration of the second delay is after the expiration of the first delay.

18. The method of claim 11, further comprising, when the fault condition detected is a single port single plane fault condition associated with the fourth PIU port and the second Ethernet fabric plane:
after expiration of a first delay associated with the first PIU module, transmitting the single port single plane fault condition associated with the fourth PIU port and the second Ethernet fabric plane to other PIU modules of the plurality of PIU modules using one of the fifth PIU port and the first Ethernet fabric plane; and after expiration of a second delay associated with the first PIU module, when there is no occurrence of other fault conditions on the first Ethernet fabric plane, confirming the single port single plane fault condition associated with the fourth PIU port and the second Ethernet fabric plane, wherein the expiration of the second delay is after the expiration of the first delay.

19. The method of claim 11, further comprising, when the fault condition detected is a single port single plane fault condition associated with the fourth PIU port and the second Ethernet fabric plane:

after expiration of a first delay associated with the first PIU module, transmitting the single port single plane fault condition associated with the fourth PIU port and the second Ethernet fabric plane to other PIU modules of the plurality of PIU modules using one of the fifth PIU port and the first Ethernet fabric plane; and during a second delay associated with the first PIU module, when there is an occurrence of other fault conditions on the second Ethernet fabric plane, transmitting the multiple port single plane fault condition associated with the second Ethernet fabric plane to the other PIU modules using the first Ethernet fabric plane, wherein the second delay is after the expiration of the first delay.

20. The method of claim 19, wherein the occurrence of other fault conditions on the second Ethernet fabric plane includes at least one of a second single port single plane fault condition associated with the second Ethernet fabric plane detected by the first PIU module, a second multiple port single plane fault condition associated with the second Ethernet fabric plane detected by the first PIU module, a third single port single plane fault condition associated with the second Ethernet fabric plane received from one of the other PIU modules, and a third multiple port single plane fault condition associated with the second Ethernet fabric plane received from one of the other PIU modules.

* * * * *